(12) United States Patent
Horikawa et al.

(10) Patent No.: US 8,577,946 B2
(45) Date of Patent: Nov. 5, 2013

(54) SIGNAL RECEIVING APPARATUS AND COMMUNICATION SYSTEM

(75) Inventors: Seiichiro Horikawa, Kawasaki (JP); Koichiro Ban, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 86 days.

(21) Appl. No.: 13/361,081

(22) Filed: Jan. 30, 2012

(65) Prior Publication Data
US 2012/0127849 A1 May 24, 2012

Related U.S. Application Data

(63) Continuation of application No. PCT/JP2009/063689, filed on Jul. 31, 2009.

(51) Int. Cl.
*G06F 15/00* (2006.01)
(52) U.S. Cl.
USPC ........... 708/409; 370/210; 370/480; 708/403; 708/404
(58) Field of Classification Search
USPC ......... 370/203–211, 252, 319–325, 343–344, 370/430, 480–497; 708/403–409
See application file for complete search history.

(56) References Cited

U.S. PATENT DOCUMENTS

| | | |
|---|---|---|
| 6,826,239 B1 | 11/2004 | Usui |
| 2002/0194235 A1 | 12/2002 | Yamamoto et al. |
| 2005/0273483 A1* | 12/2005 | Dent ............................ 708/490 |
| 2007/0198623 A1* | 8/2007 | Karino ........................ 708/404 |

FOREIGN PATENT DOCUMENTS

| | | |
|---|---|---|
| JP | 11-298436 | 10/1999 |
| JP | 2002-351858 | 12/2002 |
| JP | 2007-221596 | 8/2007 |
| JP | 2008-217359 | 9/2008 |

OTHER PUBLICATIONS

International Search Report for PCT/JP2009/063689 mailed Aug. 25, 2009.

* cited by examiner

*Primary Examiner* — Abdullah Riyami
*Assistant Examiner* — Eric Myers
(74) *Attorney, Agent, or Firm* — Nixon & Vanderhye, P.C.

(57) ABSTRACT

There is provided a signal receiving apparatus including first to pth stage computers configured to apply, in a step-by-step manner, butterfly operations to $2^N$ input values; and $2^N$ registers configured to store values obtained by a p–1th stage computer wherein the pth stage computer includes (a) $2^L$ butterfly operation circuits configured to transmit, from corresponding $2^M$ output ports, values obtained by the butterfly operations based on values provided to $2^M$ input ports and (b) $2^L$ selecting circuits arranged corresponding to the butterfly operation circuits, each selecting circuit providing a value of a register corresponding to different one of $2^L$ BFInOrder_i (j,t) (wherein, BFInOrder_i(j,t) denotes values obtained by converting BFOutOrder_i(j,t)=t+j*$2^{(N-M)}$+i*$2^{N-(M+L)}$ or $(2^{(N-(M+L))}-1-t)+j*2^{(N-M)}+i*2^{(N-(M+L))}$) expressed by base H to base $2^M$ of $(\log_{2^M} 2^N)-1$ words, word-reversing the values converted to base $2^M$, and converting the word-reversed values to the base H).

3 Claims, 31 Drawing Sheets

FAST FOURIER TRANSFORM UNIT
OF FIRST EMBODIMENT
205

BFInOrder_i(j,t) OF FIRST EMBODIMENT

BFInOrder_0(j,t)

| j\t | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 32 | 16 | 48 | 8 | 40 | 24 | 56 | 4 | 36 | 20 | 52 | 12 | 44 | 28 | 60 |
| 1 | 1 | 33 | 17 | 49 | 9 | 41 | 25 | 57 | 5 | 37 | 21 | 53 | 13 | 45 | 29 | 61 |

BFInOrder_1(j,t)

| j\t | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 2 | 34 | 18 | 50 | 10 | 42 | 26 | 58 | 6 | 38 | 22 | 54 | 14 | 46 | 30 | 62 |
| 1 | 3 | 35 | 19 | 51 | 11 | 43 | 27 | 59 | 7 | 39 | 23 | 55 | 15 | 47 | 31 | 63 |

FIG. 7

BFOutOrder_i(j,t) OF FIRST EMBODIMENT

BFOutOrder_0(j,t)

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 32 | 33 | 34 | 35 | 36 | 37 | 38 | 39 | 40 | 41 | 42 | 43 | 44 | 45 | 46 | 47 |

BFOutOrder_1(j,t)

| 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|
| 48 | 49 | 50 | 51 | 52 | 53 | 54 | 55 | 56 | 57 | 58 | 59 | 60 | 61 | 62 | 63 |

FIG. 8

ORDERS OF OUTPUT BY BUTTERFLY OPERATION CIRCUITS OF FIRST EMBODIMENT

ORDER OF OUTPUT BY BUTTERFLY OPERATION CIRCUIT 5_0

ORDER OF OUTPUT BY BUTTERFLY OPERATION CIRCUIT 5_1

OUTPUT CONTROLLER OF FIRST EMBODIMENT

ORDER OF OUTPUT BY FAST FOURIER TRANSFORM UNIT
OF FIRST EMBODIMENT

ORDER OF OUTPUT BY FAST FOURIRE TRANSFORM UNIT
OF SECOND EMBODIMENT

SIGNAL FORMAT (CARRIER ARRANGEMENT)
OF THIRD EMBODIMENT

ORDERS OF OUTPUT BY BUTTERFLY OPERATION CIRCUITS
OF THIRD EMBODIMENT

ORDER OF OUTPUT BY FAST FUOURIER TRANSFORM UNIT
OF THIRD EMBODIMENT

SIGNAL FORMAT (CARRIER ARRANGEMENT)
OF FOURTH EMBODIMENT

BFInOrder_i(j,T) OF FOURTH EMBODIMENT

BFInOrder_0(j,t)

|   | 0 | 2 | 4 | 6 | t |
|---|---|---|---|---|---|
| 0 | 0 | 16 | 32 | 48 | 4 | 20 | 36 | 52 |
|   | 1 | 17 | 33 | 49 | 5 | 21 | 37 | 53 |
| 2 | 2 | 18 | 34 | 50 | 6 | 22 | 38 | 54 |
|   | 3 | 19 | 35 | 51 | 7 | 23 | 39 | 55 | j

BFInOrder_1(j,t)

|   | 0 | 2 | 4 | 6 | t |
|---|---|---|---|---|---|
| 0 | 8 | 24 | 40 | 56 | 12 | 28 | 44 | 60 |
|   | 9 | 25 | 41 | 57 | 13 | 29 | 45 | 61 |
| 2 | 10 | 26 | 42 | 58 | 14 | 30 | 46 | 62 |
|   | 11 | 27 | 43 | 59 | 15 | 31 | 47 | 63 | j

FIG. 31

BFOutOrder_I(j,t) OF FOURTH EMBODIMENT

BFOutOrder_0(j,t)

|   | 0 | 2 | 4 | 6 | t |
|---|---|---|---|---|---|
| 0 | 0 | 1 | 2 | 3 | 4 | 5 | 6 | 7 |
|   | 16 | 17 | 18 | 19 | 20 | 21 | 22 | 23 |
| 2 | 32 | 33 | 34 | 35 | 36 | 37 | 38 | 39 |
|   | 48 | 49 | 50 | 51 | 52 | 53 | 54 | 55 | j

BFOutOrder_1(j,t)

|   | 0 | 2 | 4 | 6 | t |
|---|---|---|---|---|---|
| 0 | 8 | 9 | 10 | 11 | 12 | 13 | 14 | 15 |
|   | 24 | 25 | 26 | 27 | 28 | 29 | 30 | 31 |
| 2 | 40 | 41 | 42 | 43 | 44 | 45 | 46 | 47 |
|   | 56 | 57 | 58 | 59 | 60 | 61 | 62 | 63 | j

FIG. 32

ORDER OF OUTPUT BY FAST FOURIER TRANSFORM UNIT
OF FOURTH EMBODIMENT

SIGNAL FORMAT (CARRIER ARRANGEMENT)
OF FIFTH EMBODIMENT

ORDERS OF OUTPUT BY BUTTERFLY OPERATION CIRCUITS OF FIFTH EMBODIMENT

ORDER OF OUTPUT BY BUTTERFLY OPERATION CIRCUIT 2_0

| j\t | 0 | 1 | 2 | 3 |
|---|---|---|---|---|
| 0 | 0 | 1 | 2 | 3 |
| 1 | 16 | 17 | 18 | 19 |
| 2 | 32 | 33 | 34 | 35 |
| 3 | 48 | 49 | 50 | 51 |

ORDER OF OUTPUT BY BUTTERFLY OPERATION CIRCUIT 2_1

| j\t | 0 | 1 | 2 | 3 |
|---|---|---|---|---|
| 0 | 4 | 5 | 6 | 7 |
| 1 | 20 | 21 | 22 | 23 |
| 2 | 36 | 37 | 38 | 39 |
| 3 | 52 | 53 | 54 | 55 |

ORDER OF OUTPUT BY BUTTERFLY OPERATION CIRCUIT 2_2

| j\t | 0 | 1 | 2 | 3 |
|---|---|---|---|---|
| 0 | 8 | 9 | 10 | 11 |
| 1 | 24 | 25 | 26 | 27 |
| 2 | 40 | 41 | 42 | 43 |
| 3 | 56 | 57 | 58 | 59 |

ORDER OF OUTPUT BY BUTTERFLY OPERATION CIRCUIT 2_3

| j\t | 0 | 1 | 2 | 3 |
|---|---|---|---|---|
| 0 | 12 | 13 | 14 | 15 |
| 1 | 28 | 29 | 30 | 31 |
| 2 | 44 | 45 | 46 | 47 |
| 3 | 60 | 61 | 62 | 63 |

▨ : null CARRIERS

FIG. 40

ORDER OF OUTPUT BY FAST FOURIER TRANSFORM UNIT
OF FIFTH EMBODIMENT

| | 0 | 0 | t | |
|---|---|---|---|---|---|
| 0 | 28 | 1 | 2 | 3 | -----S0 |
| | 4 | 5 | 6 | 7 | -----S1 |
| 2 | 8 | 9 | 10 | 11 | -----S2 |
| | 12 | 13 | 14 | 15 | -----S3 |
| 4 | 16 | 17 | 18 | 19 | -----S4 |
| | 20 | 21 | 22 | 23 | -----S5 |
| 6 | 24 | 25 | 26 | 27 | -----S6 |
| | 36 | 37 | 38 | 39 | -----S7 |
| 8 | 40 | 41 | 42 | 43 | -----S8 |
| | 44 | 45 | 46 | 47 | -----S9 |
| 10 | 48 | 49 | 50 | 51 | -----S10 |
| | 52 | 53 | 54 | 55 | -----S11 |
| 12 | 56 | 57 | 58 | 59 | -----S12 |
| | 60 | 61 | 62 | 63 | -----S13 |

PARALLEL

SIGNAL RECEIVING APPARATUS AND COMMUNICATION SYSTEM

CROSS REFERENCE TO RELATED APPLICATIONS

This application is a continuation of International Application No. PCT/JP2009/063689, filed on Jul. 31, 2009, the entire contents of which is hereby incorporated by reference.

FIELD

An embodiment relates to a signal receiving apparatus and a communication system.

BACKGROUND

There is a technique of changing an order of output data of a fast Fourier transform (FFT) unit to an order suitable for a latter circuit in order to reduce the power consumption of the latter circuit of the FFT unit. JP-A 11-298436 (Kokai) discloses a method of applying a de-interleaving process to output data of an FFT circuit to change the order of the output data to set an order suitable for a demodulating process by a latter stage. However, a large number of registers that hold values of the output data and selectors are necessary for a processing block that executes the de-interleaving process, and there is a problem that the circuit size increases.

BRIEF DESCRIPTION OF THE DRAWINGS

FIG. 7 is a diagram showing BFInOrder_i(j, t) functions of the first embodiment;

FIG. 8 is a diagram showing BFOutOrder_i(j, t) functions of the first embodiment;

FIG. 31 is a diagram showing BFInOrder_i(j, t) functions of the fourth embodiment;

FIG. 32 is a diagram showing BFOutOrder_i(j, t) functions of the fourth embodiment;

FIG. 40 is a diagram showing orders of output by the butterfly operation circuits of the fifth embodiment;

FIG. 42 is a diagram showing an order of output by the FFT unit of the fifth embodiment.

DETAILED DESCRIPTION

There is provided with a signal receiving apparatus of an orthogonal frequency division multiplex scheme using $2^N$ subcarriers including $2^{(N-(M+L))}*2k$ data subcarriers and $2^N - \{2^{(N-(M+L))}*2k\}$ null subcarriers.

"N" is an integer equal to or greater than 2, "M" is an integer equal to or greater than 1 where $2^N/2^M$ is an integer, "L" is an integer equal to or greater than 1 and equal to or smaller than (N−M−1) when "M" is 1 and is an integer equal to or greater than 0 and equal to or smaller than (N−M−1) when "M" is greater than 1, and "k" is an integer satisfying $1 \leq k \leq 2^{(M+L-1)}-1$.

The signal receiving apparatus includes 0th to p−1th ("p" is a value equal to ($\log_{2^M} 2^N$)−1) stage computers, $2^N$ registers, a pth stage computer and an output controller.

The 0th to p−1th ("p" is a value equal to ($\log_{2^M} 2^N$)−1) stage computers applies, in a step by step manner, butterfly operations to $2^N$ input values corresponding to $2^N$ FFT (Fast Fourier Transform) points.

The $2^N$ registers are arranged corresponding to the $2^N$ FFT points and store values obtained by the butterfly operation by the p−1th stage computer.

A pth stage computer includes (a) $2^L$ butterfly operation circuits and (b) $2^L$ selecting circuits.

The $2^L$ butterfly operation circuits, each includes $2^M$ input ports and $2^M$ output ports, performs the butterfly operation based on values provided to the input ports, and transmits values obtained by the butterfly operation from the corresponding output ports.

The $2^L$ selecting circuits are arranged corresponding to the butterfly operation circuits, each selecting circuit reading a value of a register corresponding to different one of $2^L$ BFInOrder_i(j,t) and provides the value to a j ($0 \leq j \leq 2^M-1$)th input port of the corresponding butterfly operation circuit.

The BFInOrder_i(j,t) denotes values obtained by converting BFOutOrder_i(j,t) expressed by base H to base $2^M$ of $\log_{2^M} 2^N$ words, word-reversing the converted values, and converting the word-reversed values to the base H, wherein "H" is an integer greater than 1.

The BFOutOrder_i(j,t) denotes $t+j*2^{(N-M)}+i*2^{N-(M+L)}$ or $(2^{(N-(M+L))}-1-t)+j*2^{(N-M)}+i*2^{(N-(M+L))}$, wherein "t" is an integer expressing a computation time being 0 or greater and $2^{(N-M+L)}-1$ or smaller, and i is an integer 0 or greater and $2^L-1$ or smaller.

The output controller selectively outputs values corresponding to the data subcarriers among the values transmitted from the output ports of the butterfly operation circuits.

Hereinafter, the embodiments will be explained with the accompanying drawings

First Embodiment

Figure 1:
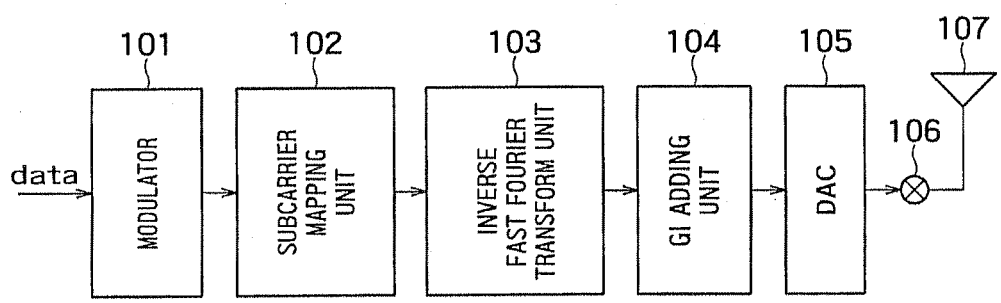
FIG. 1 is a block diagram showing a configuration of a signal transmitting apparatus of the present embodiment.

FIG. 1 shows a configuration of a signal transmitting apparatus according to a first embodiment.

A signal transmitting apparatus 100 of FIG. 1 includes a modulator 101, a subcarrier mapping unit 102, an inverse fast Fourier transform (IFFT) unit 103, a guard interval (GI) adding unit 104, a digital-analog conversion (DAC) unit 105, a frequency converter 106, and an antenna 107.

Figure 2:
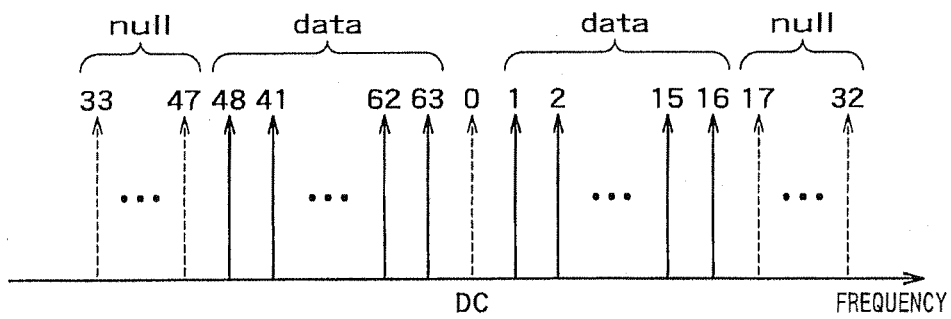
FIG. 2 is a diagram showing a signal format (carrier arrangement) of a first embodiment.

The modulator 101 applies a modulation process, such as BPSK (Binary Phase Shift Keying), QPSK (Quadrature Phase Shift Keying), 16QAM (Quadrature Amplitude Modulation), or 64QAM, to input data. The subcarrier mapping unit 102 allocates the modulated data to subcarriers of a frequency domain. FIG. 2 shows a subcarrier arrangement after the allocation of the modulated data to the subcarriers of the frequency domain. Data is symmetrically mapped to data carriers around the center frequency. Null data is mapped to null carriers.

Although the number of data carriers and the number of null carriers are 32 in the present embodiment, the number of data carriers and the number of null carriers may be arbitrary as long as the following formulas are satisfied.

The number of data carriers=$2^{(N-(M+L))}*2k$ ($k$ is an integer satisfying $1 \leq k \leq 2^{(M+L-1)}-1$)  Formula (1)

The number of null carriers=$2^N$−the number of data carriers  Formula (2)

Wherein, "N", "M", and "L" are parameters indicating a configuration of a fast Fourier transform (FFT) unit of a signal receiving apparatus described later (see FIG. 3). Based on the parameters, the number of points of the FFT unit is $2^N$ ("N" is an integer equal to or greater than 2), the base of butterfly operation circuits arranged on each stage computer forming the FFT unit is $2^M$ ("M": integer equal to or greater than 1 where $2^N/2^M$ is an integer), and the parallel number of the butterfly operation circuits of a final stage computer is $2^L$. Here, "L" is one of the integers 1, 2, ... (N−M−1) if M=1 and is one of the integers 0, 1, ... (N−M−1) if M>1.

Hereinafter, N=6, M=1, L=1, and k=1 in the description. More specifically, the number of points of the FFT unit in the signal receiving apparatus is 64 (N=6), the base of the butterfly operation circuit is 2 (M=1), and the parallel number of the butterfly operation circuits of the final stage computer is 2 (L=1).

Returning to FIG. 1, the IFFT unit 103 converts the data mapped to the subcarriers of the frequency domain (mapping data) to an OFDM (Orthogonal Frequency Division Multiplexing) signal on the time domain. The GI adding unit 104 inserts (adds) the same data as part of the end of the OFDM signal to the top of the OFDM signal as a guard interval.

The DAC unit 105 converts the signal, to which the GI adding unit 104 has inserted the guard interval, from a digital signal to an analog signal, and the frequency converter 106 converts the signal to an RF (Radio Frequency) signal. The RF signal is transmitted (emitted) to the air as a radio wave from the antenna 107.

Figure 3:
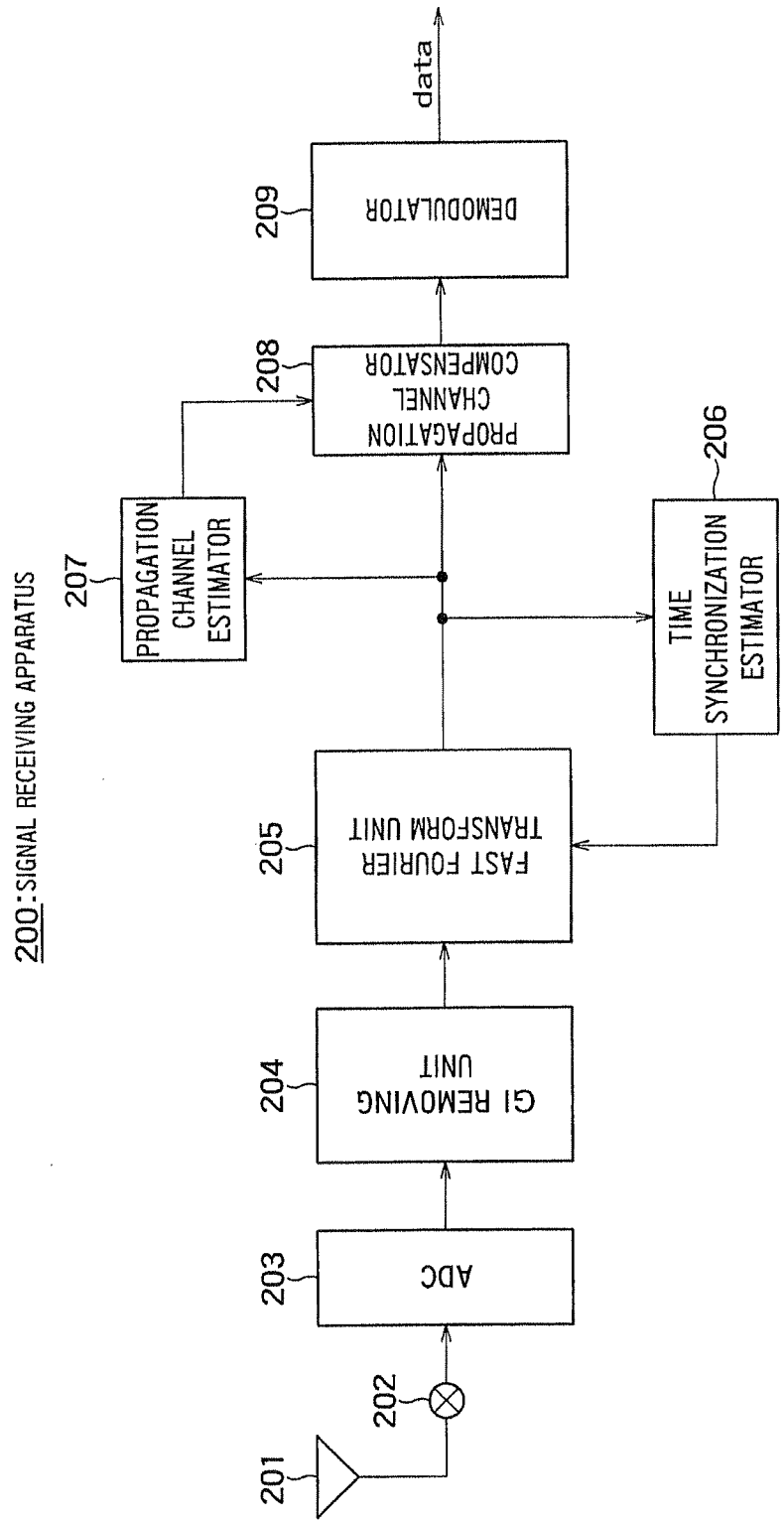
FIG. 3 is a block diagram showing a configuration of a signal receiving apparatus of the present embodiment.

FIG. 3 shows a configuration of the signal receiving apparatus according to the present embodiment. A set of the signal receiving apparatus of FIG. 3 and the signal transmitting apparatus of FIG. 1 forms a communication system.

A signal receiving apparatus 200 of FIG. 3 includes an antenna 201, a frequency converter 202, an analog-digital conversion (ADC) unit 203, a guard interval (GI) removing unit 204, an FFT unit 205, a time synchronization estimator 206, a propagation channel estimator 207, a propagation channel compensator 208, and a demodulator 209.

The frequency converter 202 converts the RF signal received by the antenna 201 to a baseband signal, and the ADC unit 203 converts the signal from an analog signal to a digital signal. The GI removing unit 204 removes the GI from the digital signal.

The FFT unit 205 applies an FFT process to the signal, from which the GI is removed, for $2^N$ samples from an FFT start timing signal in accordance with an FFT start timing signal from the time synchronization estimator 206 described later to convert the signal to a signal on the frequency axis. The FFT unit 205 of the present embodiment is controlled to consecutively output the data subcarriers that are adjacent in terms of frequency to simplify the computing process by the time synchronization estimator 206. Details of the FFT unit 205 will be described later with reference to FIGS. 4 to 8.

The time synchronization estimator 206 detects the FFT start timing signal indicating the starting position of an effective symbol period of the OFDM signal and outputs an FFT start timing detection signal. Although various methods are known as methods for detecting the starting position of the effective symbol period of the OFDM signal, phase differences between adjacent subcarriers in the frequency domain are used to detect the starting position of the effective symbol period in the present embodiment.

Returning to FIG. 3, the propagation channel compensator 208 compensates a signal distortion, which is caused by a multipath generated in a propagation channel, of the signal on the frequency axis obtained by the FFT unit 205. The distortion compensating process is executed based on a propagation channel estimation value calculated by the propagation channel estimator 207. The propagation channel estimator 207 estimates the propagation channel by a known method based on a pilot signal to calculate the propagation channel estimation value.

The demodulator 209 applies a demodulating process, such as BPSK (Binary Phase Shift Keying), QPSK (Quadrature Phase Shift Keying), 16QAM (Quadrature Amplitude Modulation), or 64QAM, to the signal, in which the signal distortion is compensated, to obtain demodulated data.

Hereinafter, details of the FFT unit 205 of the signal receiving apparatus 200 will be described with reference to FIGS. 4 to 8. It is assumed in the present embodiment that the FFT unit 205 and the time synchronization estimator 206 that is the latter stage of the FFT unit 205 have parallel circuit configurations to increase the internal computing speed. As described, the number of points of the FFT unit 205 is 64 (N=6), and the base of the butterfly operation circuit is 2 (M=1) in the description of the present embodiment.

Hereinafter, the overall configuration of the FFT unit 205 will be described first with reference to FIGS. 4 to 6, and then the operation will be described.

Figure 4:
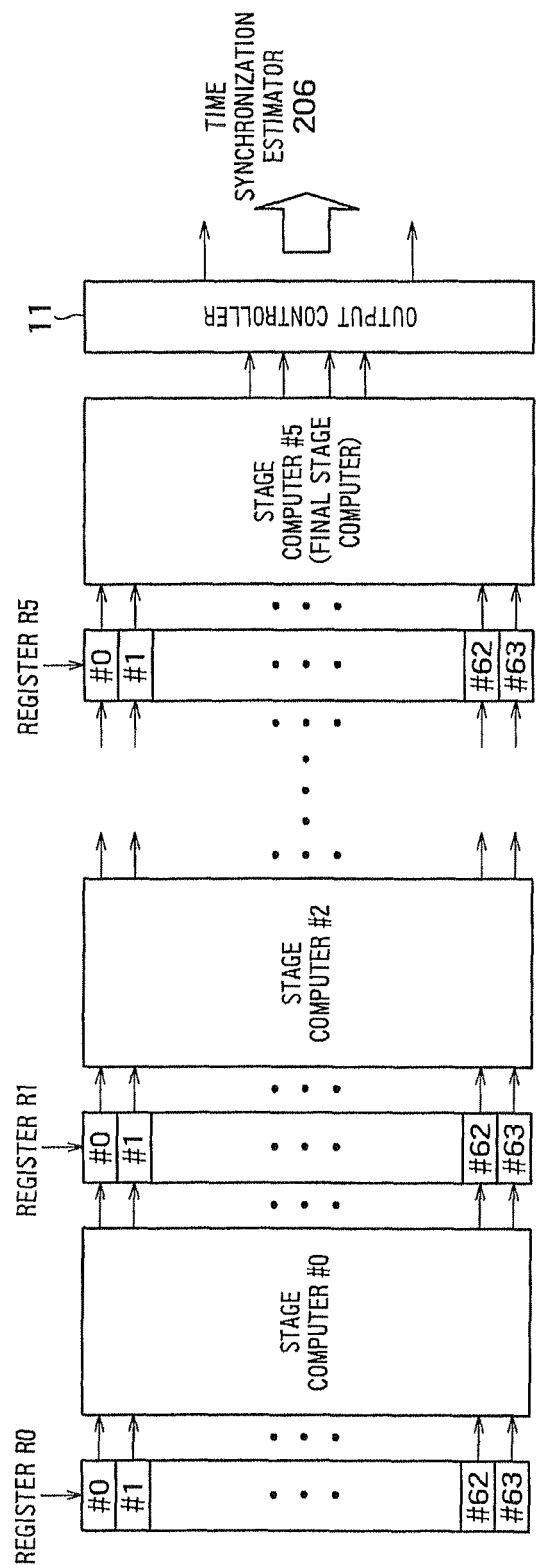
FIG. 4 is a diagram showing a configuration of an FFT unit of the first embodiment.

FIG. 4 shows a configuration of the FFT unit 205 according to the first embodiment. The FFT unit 205 includes: a plurality of sequential stage computers #0 to #5; register groups R0 to R5 including registers #0 to #63 that temporarily store input values to the FFT unit 205 or output values of the stage computers, the number of registers #0 to #63 being equal to the number of points of the FFT unit (64 in the present embodiment); and an output controller 11 that controls output of values (data corresponding to the subcarriers) obtained by the stage computer #5 (final stage computer).

In general, the number of stage computers of the FFT unit is determined by the following formula.

The number of stage computers=log<sub>base of butterfly operation circuits</sub>(the number of points of the FFT unit)

According to the formula, the number of stage computers is $\log_2 64=6$ in the present embodiment.

Figure 5:
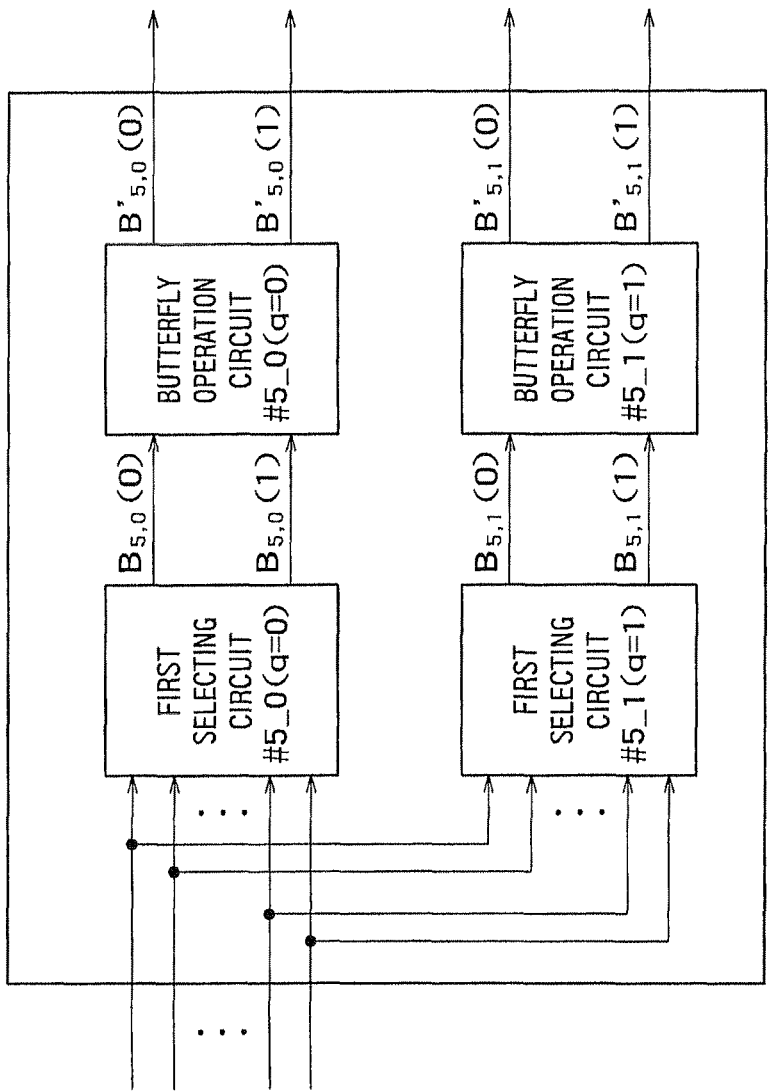
FIG. 5 is a diagram showing a configuration of a final stage computer of the first embodiment.

FIG. 5 shows a configuration of the stage computer #5 (final stage computer).

The stage computer #5 (final stage computer) includes a plurality of butterfly operation circuits #5_0 and #5_1 and the same number of first selecting circuits #5_0 and #5_1 (corresponding to selecting circuits) as the number of the butterfly operation circuits.

Figure 6:
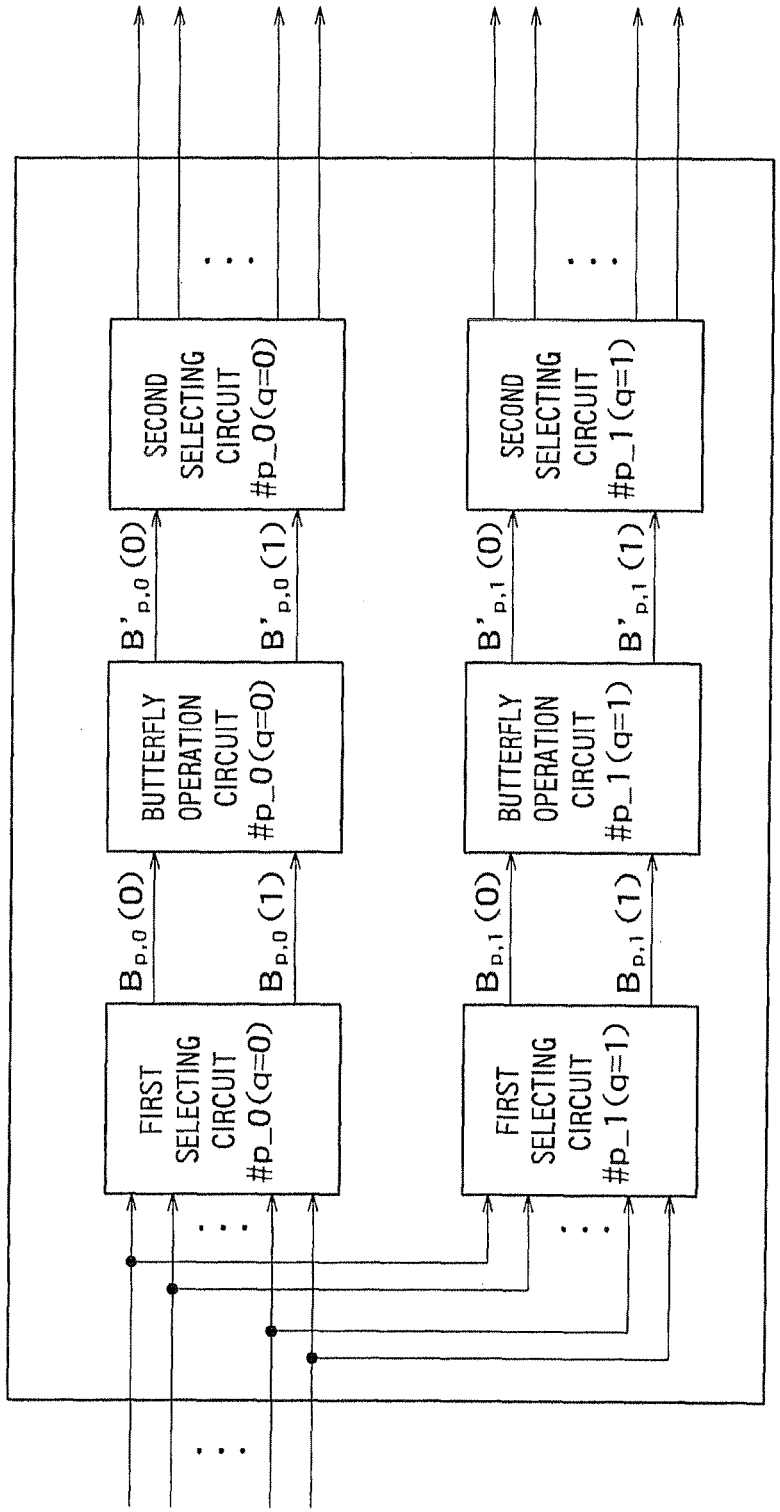
FIG. 6 is a diagram showing a configuration of stage computers other than the final stage computer of the first embodiment.

FIG. 6 shows a configuration of the stage computers #0 to #4 other than the stage computer #5 (final stage computer).

The stage computers #0 to #4 include one or a plurality of butterfly operation circuits, the same number of first selecting circuits as the number of the butterfly operation circuits, and the same number of second selecting circuits as the number of the butterfly operation circuits. Although the parallel number of the butterfly operation circuits of the stage computers #0 to #4 in the present embodiment is two, which is the same as the parallel number of the butterfly operation circuits of the stage computer #5 (final stage computer), the value may be different from that of the stage computer #5 (final stage computer).

Although each of the stage computers #0 to #5 individually includes the butterfly operation circuits to simplify the description in the present embodiment, the stage computers may share the butterfly operation circuits. Although each stage computer includes a register group in the present embodiment, the stage computers #0 to #5 may share one or a plurality of register groups.

An operation of the FFT unit 205 will be described with reference to FIGS. 4 to 8.

Input signals x(a) ($0 \leq a \leq 2^N-1$) of the FFT unit 205 are stored in the registers determined by registers #a=x(a) ($0 \leq a \leq 63$) in the register group R0, respectively.

The input signals x(0), x(1), x(2), ..., and x(63) correspond to values of 64 FFT points sequentially arranged from the top of the effective symbol period. Numbers (indices) of #0 to #63 are provided to the registers, and the input signals x(0), x(1), x(2), ..., and X(63) are stored in the registers #0 to #63 with the same indices. Although the indices are expressed in decimal here, the indices may be expressed by a different base. Although the input signals are stored in the registers with corresponding indices here, there is no problem in storing the input signals in the registers with different indices as long as the association is clearly defined.

The signals stored in the registers #0 to #63 of the register group R0 are input to the stage computer #0. More specifically, first selecting circuits #p_0 and #p_1 (p=0 here) shown in FIG. 6 select two registers each at the same time and input the registers in corresponding butterfly operation circuits #p_0 and #p_1. The register values selected by the first selecting circuit #p_0 are expressed by $B_{p,0}(0)$ and $B_{p,0}(1)$ in FIG. 6, and the register values selected by the first selecting circuit #p_1 are expressed by $B_{p,1}(0)$ and $B_{p,1}(1)$ in FIG. 6.

The registers selected by the first selecting circuits #p_0 and #p_1, i.e. #p_0 and #p_1 input values of the butterfly operation circuits, may be arbitrary as long as the order of an FFT algorithm (FFT algorithm of base 2 in the present embodiment) shown in the following formula is not disrupted.

$$\begin{cases} S(2k) = \sum_{n=0}^{N'/2-1} \left[ s(n) + s\left(n + \frac{N'}{2}\right) \right] \cdot W_{N'/2}^{kn}, \\ \left( k = 0, 1, \ldots, \frac{N'}{2} - 1 \right) \\ S(2k+1) = \sum_{n=0}^{N'/2-1} \left[ s(n) - s\left(n + \frac{N'}{2}\right) \right] \cdot W_{N'}^{n} \cdot W_{N'/2}^{kn}, \\ \left( k = 0, 1, \ldots, \frac{N'}{2} - 1 \right) \end{cases} \quad \text{Formula (3)}$$

Wherein, "$W_N$" denotes rotation factors, and "N" denotes the number of points of FFT, which are defined by the following formula.

$$W_{N'} = \exp\left(-j\frac{2\pi}{N'}\right)$$
$$N' = 2^N$$

Butterfly operations indicated by the following formula are applied to the values input to the butterfly operation circuits #p_0 and #p_1 based on the FFT algorithm of base 2 of the formula described above.

$$\begin{cases} B'_{p,q}(0) = B_{p,q}(0) + B_{p,q}(1) \\ B'_{p,q}(1) = [B_{p,q}(0) - B_{p,q}(1)] \cdot W_{N'}^{n} \end{cases} \quad \text{Formula 4}$$

Wherein, "Bp,q(j)" denotes input values of the butterfly operation circuits, and "B'p,q(j)" denotes output values of the butterfly operation circuits, "j" denotes numbers of input/ output ports of the butterfly operation circuits ($0 \leq j \leq 2^M - 1$), "p" notes stage computer numbers $0 \leq p \leq (\log_{2^M} 2^N) - 1$), and "q" denotes butterfly circuit numbers ($0 \leq q \leq 2^L - 1$).

Computation values (outputs B'p,q(j)) of the butterfly operation circuits #p_0 and #p_1 are input to corresponding second selecting circuits #p_0 and #p_1. For the outputs (B'p,q(j)), the second selecting circuits #p_0 and #p_1 select, from the register group R1, registers with the same numbers as the registers from which corresponding values "Bp,q(j)" are read (i.e. select registers based on the same algorithm as the first selecting circuits) and stores the outputs "B'p,q(j)" in the selected registers. For example, the register number from which "Bp,0(0)" is read and the register number in which "B'p,0(0)" is stored are the same, and the register number from which "Bp,0(1)" is read and the register number in which "B'p,0(1)" is stored are the same.

The processes by the stage computers #1 to #4 are the same as in the stage computer #0, and the detailed description will not be repeated.

An operation of the stage computer #5 (final stage computer) as a first point of the present embodiment will be described with reference to FIGS. 5, 7, and 8.

In the same way as the stage computers #0 to #4, the first selecting circuits #5_0 and #5_1 select registers and input signals of the selected registers in corresponding butterfly operation circuits #5_0 and #5_1.

In this case, the first selecting circuits of the final stage computer determine the selection order of the registers, i.e. the order of input to the butterfly operation circuits, as follows. Register numbers BFInOrder_i(j,t) (wherein, $0 \leq i \leq 2^L - 1$) selected at time t by a first selecting circuit of $2^L$ (2 in the present embodiment) first selecting circuits are determined by the following formula.

$$BFInOrder\_i(j,t) = F(BFOutOrder\_i(j,t))$$

$$BFOutOrder\_i(j,t) = t + j*2^{(N-M)} + i*2^{(N-(M+L))} \quad \text{Formula (5)}$$

"BFOutOrder_i(j,t)" denotes numbers of registers to be output from the output ports of the butterfly operation circuits, and "BFInOrder_i(j,t)" denotes numbers of input registers to the butterfly operation circuits necessary to realize the register output of the numbers.

In the formula above, "j($0 \leq j \leq 2^M - 1$)" denotes input port numbers of the butterfly operation circuits, and "t($0 \leq t \leq 2^{(N-(M+L))} - 1$)" denotes time.

"F(x)" (wherein, $0 \leq x \leq 2^N - 1$) denotes a function defined by the following procedure.
1: Convert x to base $2^M$ of r ($=\log_{2^M} 2^N$) words (convert to binary in the present embodiment, because M=1).
2: Assuming that the value converted to base $2^M$ is y(y=(A0, A1, ... Ar-1)), "y" is word-reversed to z=(Ar-1, ..., A1, A0).
3: Convert the word-reversed value "z=(Ar-1, ..., A1, A0)" to decimal. However, if the base of "x" is different from decimal, "z" can be converted to the different base. More specifically, if "x" is expressed by base H ("H" is an integer greater than 1), "z" can be converted to base "H".

Each of the first selecting circuits #5_0 and #5_1 of the stage computer #5 (final stage computer) selects different one of BFInOrder_0(j,t) and BFInOrder_1(j,t) to avoid overlapping. For example, the first selecting circuit #5_0 selects the registers of BFInOrder_0(j,t), and the first selecting circuit #5_1 selects the registers of BFInOrder_1(j,t).

An example of delivering the register number BFInOrder_1(1,5) input to the input port number j=1 of the butterfly operation circuit #5_1 at time t=5 when the first selecting circuit #5_1 selects the BFInOrder_1(j,t) will be illustrated as a specific example.

First, BFOutOrder_1(1,5) is calculated $$BFOutOrder\_1(1,5) = 5 + 1*2^{(6-1)} + 1*2^{(6-(1+1))} = 53$$

Since BFInOrder_1(1,5)=F(BFOutOrder_1(1,5), F(53) is calculated. If 53 is converted to binary, "110101" is obtained, and "101011" is obtained by word-reversing. If the word-reversed value is converted to decimal, 43 is obtained. Therefore, BFInOrder_1(1,5)=43, and the register number input to the input port number j=1 of the butterfly operation circuit #5_1 at time t=5 is 43.

FIG. 7 shows BFInOrder_0(j,t) and BFInOrder_1(j,t) calculated in the same procedure, and FIG. 8 shows corresponding BFOutOrder_0(j,t) and BFOutOrder_1(j,t). As described, each of the two first selecting circuits selects one of BFInOrder_0(j,t) and BFInOrder_1(j,t) to avoid overlapping.

Although BFInOrder_i(j,t) is obtained by inputting BFOutOrder_i(j,t) to the function F( ), a table may be used in another first method. More specifically, a first table associating the values of BFOutOrder_i(j,t) and the values of BFInOrder_i(j,t) is prepared. BFOutOrder_i(j,t) is calculated according to the formula described above, and BFInOrder_i(j,t) corresponding to the calculated value is obtained by referring to the first table.

Although BFOutOrder_i(j,t) is obtained by actually calculating $t + j*2^{(N-M)} + i*2^{(N-(M+L))}$, a table may be used in another second method. More specifically, a second table that stores values of BFOutOrder_i(j,t) of the ports j is prepared for each i according to time t, and the values BFOutOrder_i(j,t) of the ports j are obtained by referring to the second table at each time t. For example, the first selecting circuit #5_0 refers to the second table of j=0, and the first selecting circuit #5_1 refers to the second table of j=1.

There is also a method of skipping the calculation of BFOutOrder_i(j,t) and directly obtaining the values of BFInOrder_i(j,t) as a third method. More specifically, a third table storing the values of BFInOrder_i(j,t) of the ports j is prepared for each i according to the time t, and the third table is referenced to obtain the values BFInOrder_i(j,t) of the ports j for each time t. For example, the first selecting circuit #5_0 refers to the third table of j=0, and the first selecting circuit #5_1 refers to the third table of j=1.

The first to third methods are also effective in other embodiments described later.

The butterfly operation circuits #5_0 and #5_1 apply butterfly operations of base 2 (M=1) indicated by the following formula to the input values.

$$\begin{cases} B'_{5,q}(0) = B_{5,q}(0) + B_{5,q}(1) \\ B'_{5,q}(1) = [B_{5,q}(0) - B_{5,q}(1)] \end{cases} \quad \text{Formula (6)}$$

Assuming that the first selecting circuit #5_1 has selected BFInOrder_1(j,t), $B_{5,1}(0)$ is a value stored in a 42nd register, and $B_{5,1}(1)$ is a value stored in a 43rd register at time t=5 with reference to FIG. 7. The values are used to perform the butterfly operations according to Formula (6).

Figure 9:
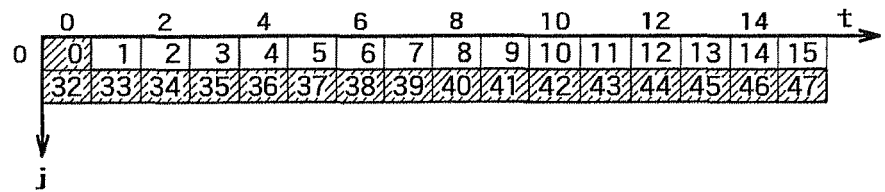
FIG. 9 is a diagram showing orders of output by butterfly operation circuits of the first embodiment.
Figure 9:
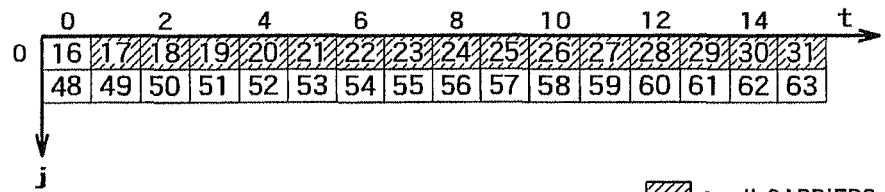

FIG. 9 shows output results of the butterfly operation circuit #5_0 and the butterfly operation circuit #5_1 when the first selecting circuit #5_0 has selected BFInOrder_0(j,t), and the first selecting circuit #5_1 has selected BFInOrder_1(j,t). In FIG. 9, numbers 0 to 63 denote subcarrier numbers described in FIG. 2, and hatched numbers denote null carriers (the orders are the same as in FIG. 8).

As is understood from FIG. 9, the first selecting circuits of the final stage computer determine the selection orders BFInOrder_i(j,t) of the registers by Formula (5), and adjacent subcarriers are sequentially output in parallel along the time domain from the butterfly operation circuits of the final stage computer in all subcarriers including the null carriers.

An operation of the output controller 11 as a second point of the present embodiment will be described with reference to FIG. 10.

Figure 10:
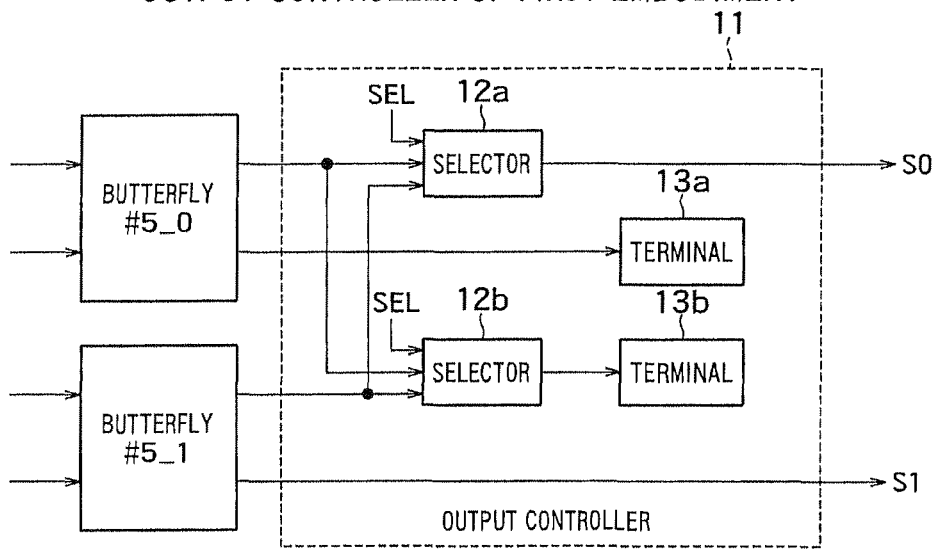
FIG. 10 is a diagram showing a configuration of an output controller of the first embodiment.

FIG. 10 shows a configuration of the output controller 11 when the first selecting circuit #5_0 of the final stage computer selects BFInOrder_0(j,t), and the first selecting circuit #5_1 selects BFInOrder_1(j,t).

The output controller 11 includes two selectors 12a and 12b and terminal ports 13a and 13b.

Data $B'_{5,0}(0)$ of a No. 0 output port (upper port) of the butterfly operation circuit #5_0 is input to both of the selectors 12a and 12b, and data $B'_{5,0}(1)$ of a No. 1 output port (lower port) is input to the terminal 13a. The terminal port 13a discards the input data (i.e. data of null subcarriers).

Data $B'_{5,1}(0)$ of a No. 0 output port (upper port) of the butterfly operation circuit #5_1 is input to both of the selectors 12b and 12a, and data $B'_{5,1}(i)$ of a No. 1 output port (lower port) is output to the outside (the time synchronization estimator 206, the propagation channel compensator 208, etc.) through a signal line S1.

The data selected by the selector 12a is output to the outside through a signal line S0, and the data selected by the selector 12b is input to the terminal port 13b. The terminal port 13b discards the input data (i.e. data of null subcarriers). The selectors 12a and 12b perform selection operations according to a selection signal SEL from the controller that controls the fast Fourier transform.

More specifically, the selectors 12a and 12b operate to exchange output positions of a right-end carrier of the signal band (16th subcarrier in the present embodiment) and a DC carrier (0th carrier) only at time (t=0 here) in which the output of the final stage computer is the DC carrier.

Therefore, the selector 12a selects and outputs data from the butterfly operation circuit #5_1 among the input data from both butterfly operation circuits only at time t=0 and selects and outputs data from the butterfly operation circuit #5_0 at other times (t=1 to 15). Meanwhile, the selector 12b selects data from the butterfly operation circuit #5_0 among the input data from both butterfly operation circuits only at time t=0 to input the data to the terminal port 13b and selects data from the butterfly operation circuit #5_1 at other times (t=1 to 15) to input the data to the terminal port 13b.

Figure 11:
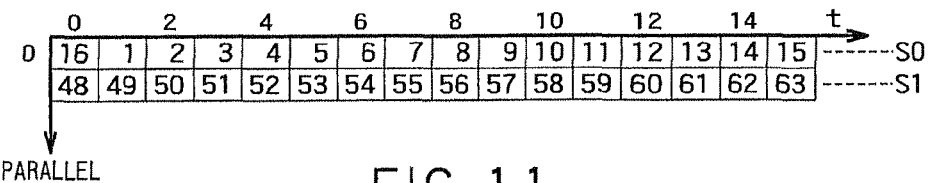
FIG. 11 is a diagram showing an order of output by the FFT unit of the first embodiment.

FIG. 11 shows an output of the output controller 11, i.e. an output of the FFT unit 205.

It is understood that adjacent data subcarriers are output in parallel and consecutively except for the right-end data carrier of the signal band (16th subcarrier) based on the operations of the selectors 12a and 12b. More specifically, the butterfly operation circuit #5_0 sequentially outputs the data subcarriers 16, 1, 2, 3, ... 14, and 15 that are adjacent except for the 16th subcarrier through the selector 12a, and the butterfly operation circuit #5_1 sequentially outputs the adjacent data subcarriers 48, 49, 50, 51, ... 62, and 63 through the selector 12b.

In this way, the output controller 11 selectively outputs the values corresponding to data subcarriers from the values (outputs) transmitted from the output ports of the butterfly operation circuits and discards the values corresponding to the null subcarriers. The output controller 11 switches the outputs (the DC carrier and the data carrier with the highest frequency at the same time as the DC carrier) of the butterfly operation circuits between the butterfly operation circuits and discards the switched DC carrier. The switched data carrier is output to the outside from the signal line.

The No. 1 output port of the butterfly operation circuit #5_1 in FIG. 10 corresponds to a port A that transmits only values corresponding to the data subcarriers. The No. 1 output port of the butterfly operation circuit #5_0 corresponds to a port B that transmits only values corresponding to the null subcarriers. The No. 0 port of the butterfly operation circuit #5_0 corresponds to a port C that transmits a value corresponding to the DC carrier among the null subcarriers and values corresponding to the data subcarriers. The No. 0 port of the butterfly operation circuit #5_1 corresponds to a port D that transmits a value corresponding to one data subcarrier and values corresponding to the null subcarriers. As can be understood from the description, the value corresponding to the DC carrier transmitted from the No. 0 port (C port) of the butterfly operation circuit #5_0 and the value corresponding to the one data subcarrier transmitted from the No. 0 port (D port) of the butterfly operation circuit #5_1 are calculated by different butterfly operation circuits (#5_0 and #5_1 here) at the same computation time.

The signal line S1 is equivalent to a first signal line that outputs values transmitted from the port A, and the signal line S0 is equivalent to a second signal line that outputs values transmitted from the port C. The terminal 13a is equivalent to a first terminal that terminates values transmitted from the port B, and the terminal 13b is equivalent to a second terminal that terminates values transmitted from the port D.

The selectors 12a and 12b switch the value corresponding to the DC carrier transmitted from the port C and the value corresponding to the one data subcarrier transmitted from the D port. In this way, the second terminal (the terminal 13b here) terminates the value corresponding to the DC carrier, and the value corresponding to the one data subcarrier is output from the second signal line (the signal line S0 here).

Although BFOutOrder_i(j,t) is defined by $t+j*2^{(N-M)}+i*2^{(N-(M+L))}$ in the embodiment, in place of this, BFOutOrder_j(j,t) may be defined by the following formula.

$$(2^{(N-M+L)}-1-t)+j*2^{(N-M)}+2^{(N-(M+L))}$$

More specifically, the following formula may be used in place of Formula (5).

BFInOrder_i(j,t)=F(BFOutOrder_i(j,t))

BFOutOrder_i(j,t)=$(2^{(N-M+L)}-1-t)+j*2^{(N-M)}+i*2^{(N-(M+L))}$     Formula (5-1)

Figure 12:
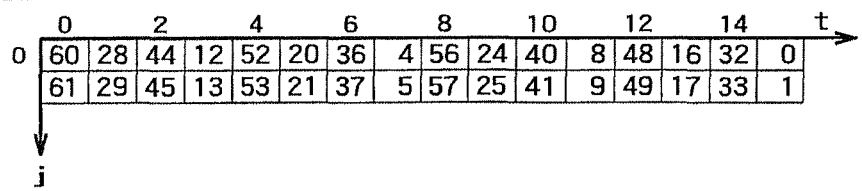
FIG. 12 is a diagram showing another example of the BFInOrder_i(j, t) functions of the first embodiment.
Figure 12:
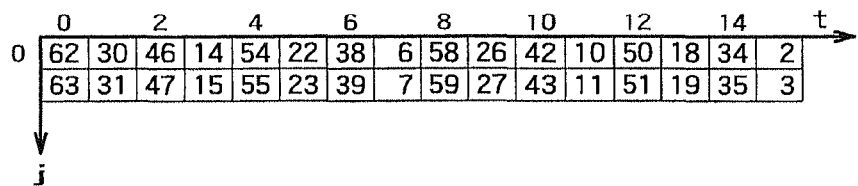
Figure 13:
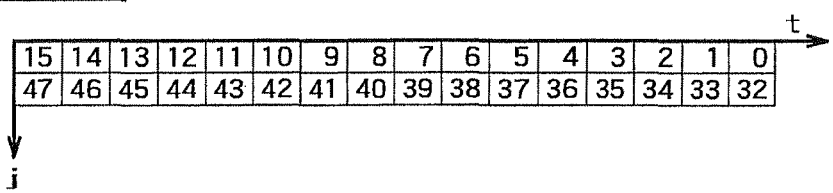
FIG. 13 is a diagram showing another example of the BFOutOrder_i(j, t) functions of the first embodiment.
Figure 13:
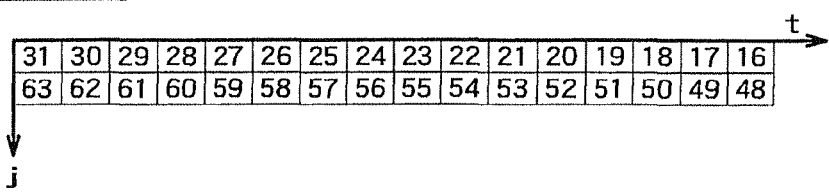
Figure 14:
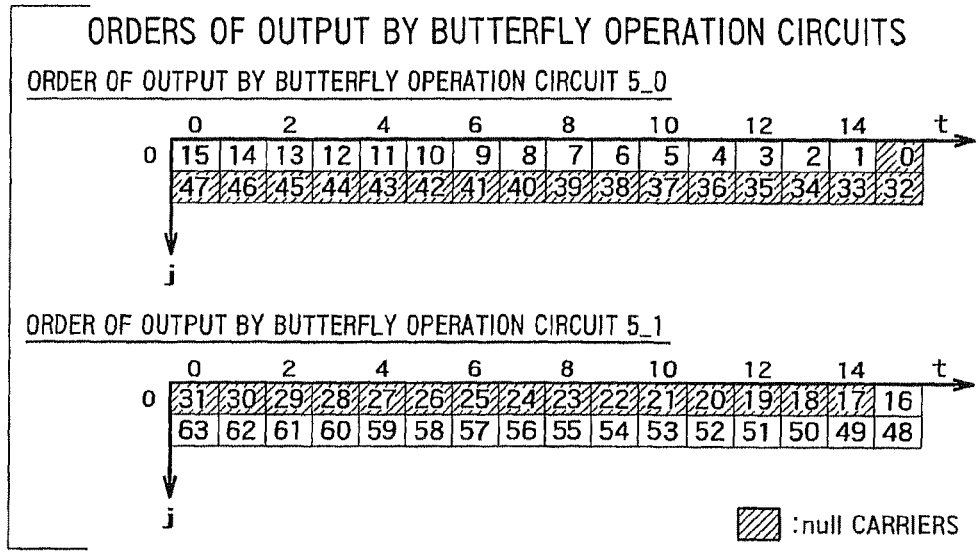
FIG. 14 is a diagram showing another example of the orders of output by the butterfly operation circuits of the first embodiment.
Figure 15:
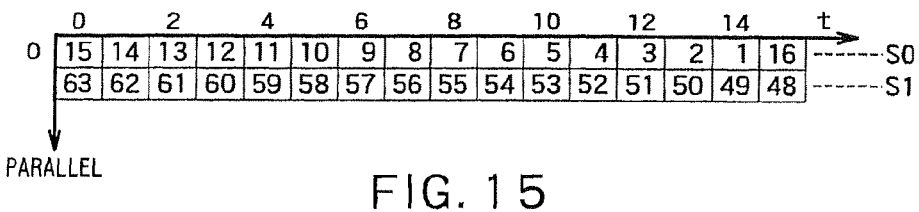
FIG. 15 is a diagram showing another example of the order of output by the FFT unit of the first embodiment.

FIG. 12 shows BFInOrder_0(j,t) and BFInOrder_1(j,t) when Formula 5-1 is used, and FIG. 13 shows corresponding BFOutOrder_0 and BFOutOrder_1. FIG. 14 shows output results of the butterfly operation circuit #5_0 and the butterfly operation circuit #5_1 when the first selecting circuit #5_0 selects BFInOrder_0(j,t) and the first selecting circuit #5_1 selects BFInOrder_1(j,t). FIG. 15 shows an output of the output controller 11, i.e. an output of the FFT unit 205. The configuration of the output controller when the new formula is used is the same as in FIG. 10. Comparing FIGS. 12 to 15 with FIGS. 7, 8, 9, and 11, the orders of output are all opposite, and it can be recognized that the carriers are switched at t=15.

According to the first embodiment, the order of output by the FFT unit can be controlled while preventing an increase in the circuit size of the FFT unit by selecting the input values (register numbers) to the butterfly operation circuits of the final stage computer according to Formula (5) or (5-1). More specifically, the data subcarriers can be output in the adjacent order in terms of frequency according to the process by the time synchronization estimator of the latter stage.

An increase in the circuit size can be further prevented by switching the outputs (the DC carrier and the data carrier with the highest frequency at the same time as the DC carrier) of the butterfly operation circuits between the butterfly operation circuits. If the carriers are not switched, the number of signal lines that output the carriers increases, and the control lines for the latter circuit become complicated. The problems can be prevented by switching the carriers, and the circuit size can be further reduced.

Second Embodiment

A second embodiment is a case in which the parameters "N", "M", "L", and "k" used in the first embodiment are N=6, M=1, L=2, and k=3. Therefore, the number of points of the FFT unit 205 is 64, the base of the butterfly operation circuits is 2, the parallel number of the butterfly operation circuits of the final stage computer is 4, and the number of data carriers is 48. In the present embodiment, the format of the signal transmitted from the signal transmitting apparatus as well as the configuration and the operation of the FFT unit 205 are different from those of the first embodiment.

Figure 16:
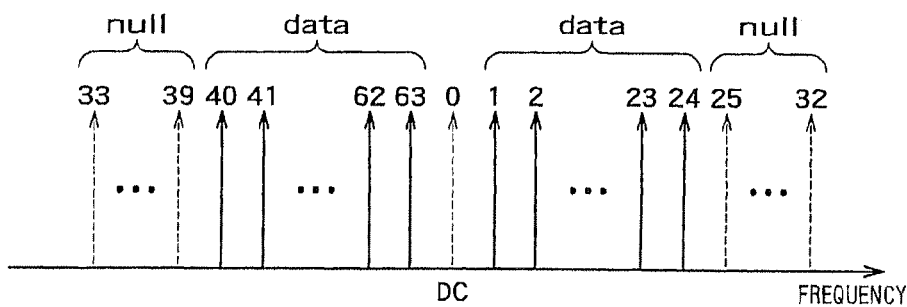
FIG. 16 is a diagram showing a signal format (carrier arrangement) of a second embodiment.

FIG. 16 shows a format of a signal transmitted from the signal transmitting apparatus according to the present embodiment.

The number of data carriers is 48, and the number of null carriers is 16.

The block diagram of the FFT unit 205 according to the present embodiment is FIG. 4 as in the first embodiment. However, the configurations and the operations of the stage computer #5 (final stage computer) and the output controller 11 are different from the first embodiment.

Figure 17:
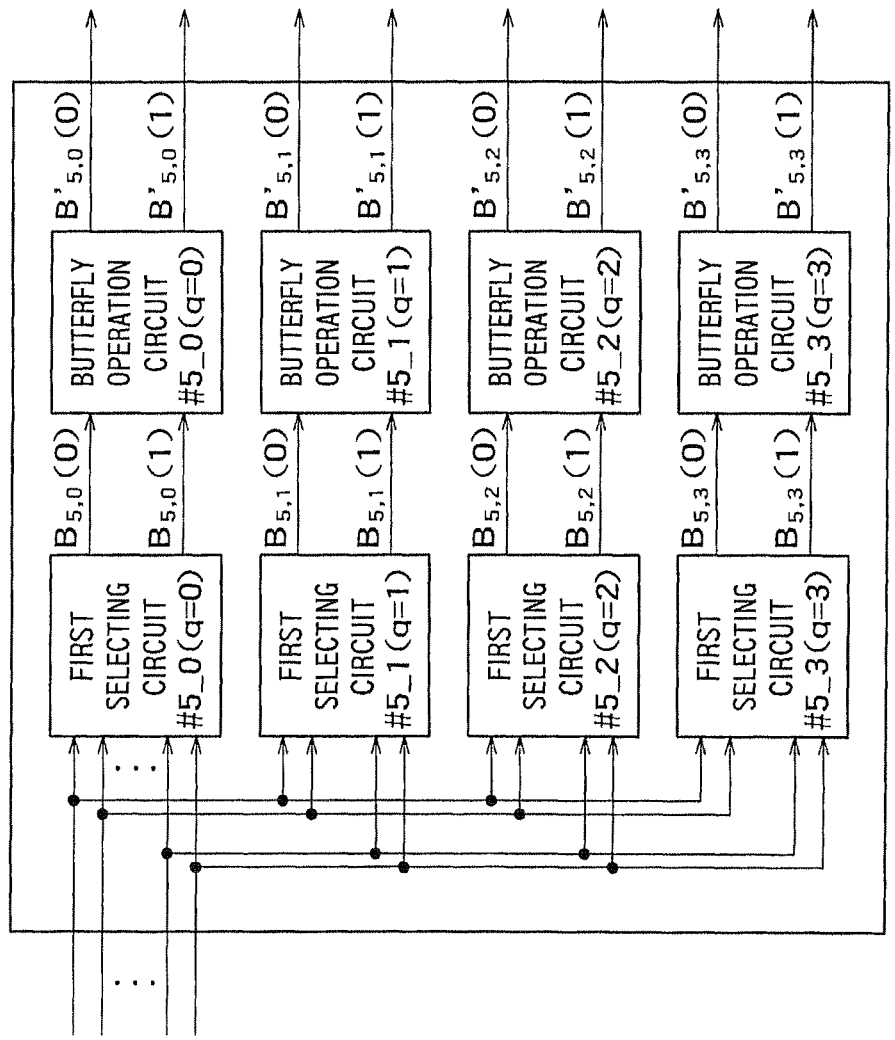
FIG. 17 is a diagram showing a configuration of the final stage computer of the second embodiment.

FIG. 17 shows a configuration of the stage computer #5 (final stage computer) of the present embodiment.

The final stage computer includes one or a plurality of butterfly operation circuits and the same number of first selecting circuits as the number of the butterfly operation circuits. In the present embodiment, the parallel number of the butterfly operation circuits of the final stage computer is 4 (L=2) as described above, and butterfly operation circuits #5_0 to #5_3 and first selecting circuits #5_0 to #5_3 are included.

An operation of the stage computer #5 (final stage computer) as a point of the present embodiment will be described with reference to FIGS. 17 to 19.

As in the first embodiment, the first selecting circuits #5_0 to #5_3 first select registers, and signals stored in the selected registers are input to the corresponding butterfly operation circuits #5_0 to #5_3. The orders of the registers selected by the first selecting circuits, i.e. the orders of input to the butterfly operation circuits are determined by Formula (5) or (5-1) shown in the first embodiment. Formula (5) will be simulated for the simplification of the description.

Figure 18:
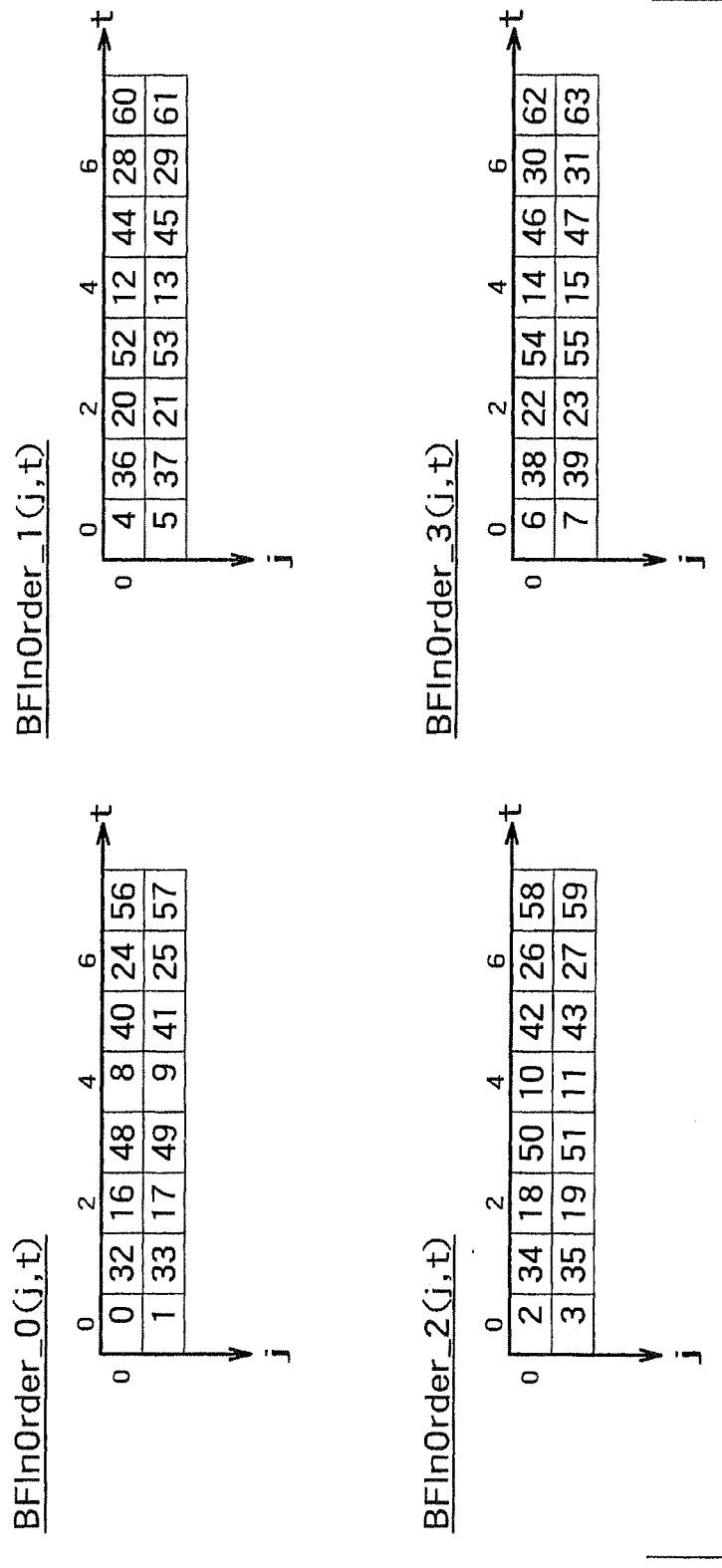
FIG. 18 is a diagram showing BFInOrder_i(j, t) functions of the second embodiment.
Figure 19:
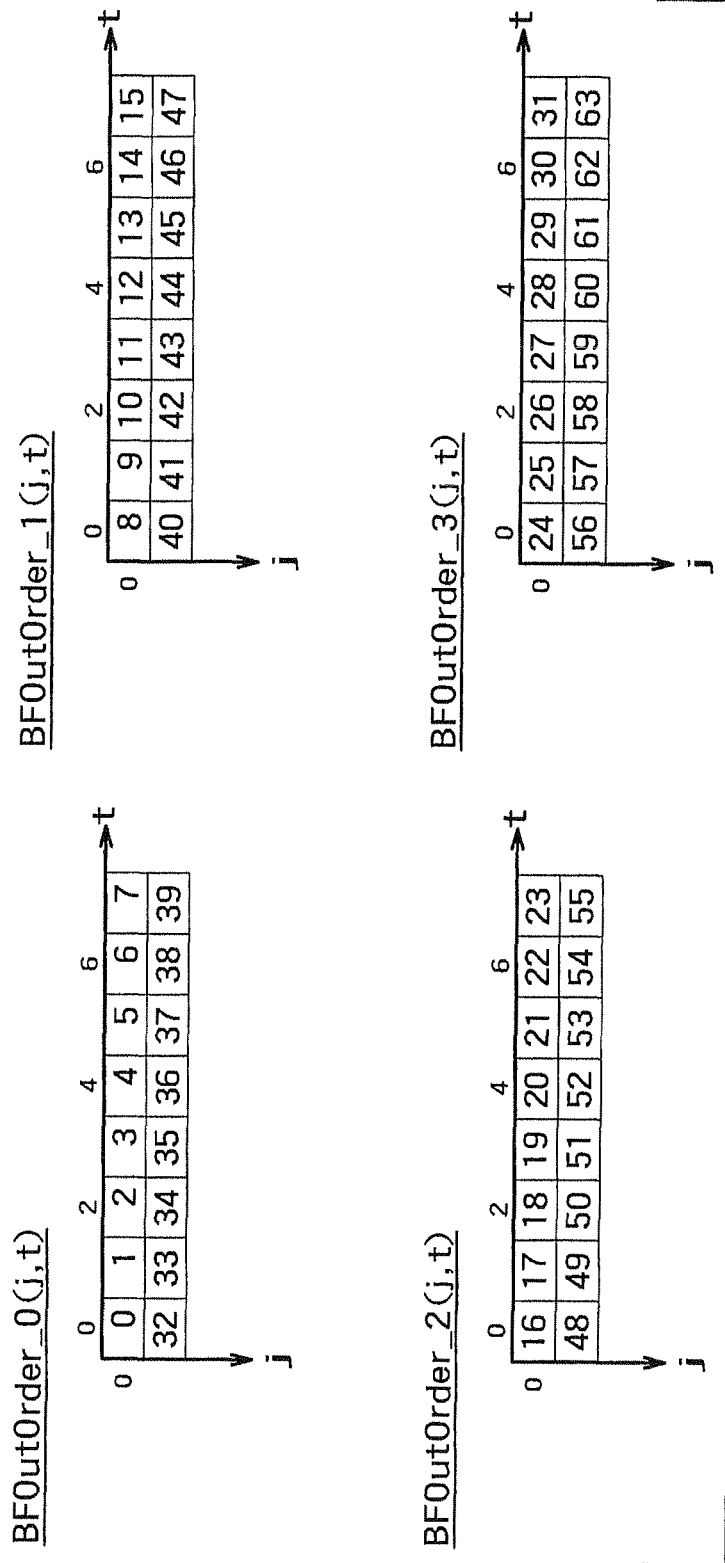
FIG. 19 is a diagram showing BFOutOrder_i(j, t) functions of the second embodiment.

FIG. 18 shows BFInOrder_0($j,t$), BFInOrder_1($j,t$), BFInOrder_2($j,t$), and BFInOrder_3($j,t$) calculated by the same procedure as in the first embodiment. FIG. 19 shows BFOutOrder_0, BFOutOrder_1, BFOutOrder_2, and BFOutOrder_3 corresponding to FIG. 18.

Each of the four first selecting circuits selects one of BFInOrder_0($j,t$), BFInOrder_1($j,t$), BFInOrder_2($j,t$), and BFInOrder_3($j,t$) to avoid overlapping.

As in the first embodiment, the butterfly operation circuits #5_0 to #5_3 apply butterfly operations of base 2 (M=1) shown in Formula (6) to the input values. Assuming that the first selecting circuit #5_1 has selected BFInOrder_1($j,t$), $B_{5,1}(0)$ is a value stored in a 44th register, and $B_{5,1}(0)$ is a value stored in a 45th register at time t=5 with reference to FIG. 18. The values are used to perform the butterfly operations.

Figure 20:
FIG. 20 is a diagram showing orders of output by the butterfly operation circuits of the second embodiment.

FIG. 20 shows output results of the butterfly operation circuit #5_0, the butterfly operation circuit #5_1, the butterfly operation circuit #5_2, and the butterfly operation circuit #5_3 when the first selecting circuit #5_0 has selected BFInOrder_0($j,t$), the first selecting circuit #5_1 has selected BFInOrder_1($j,t$), the first selecting circuit #5_2 has selected BFInOrder_2($j,t$), and the first selecting circuit #5_3 has selected BFInOrder_3($j,t$).

As can be recognized from FIG. 20, the butterfly operation circuits of the final stage computer sequentially output adjacent subcarriers in parallel in the time domain direction in all subcarriers including the null carriers.

An operation of the output controller 11 as a second point of the present embodiment will be described with reference to FIG. 21.

Figure 21:
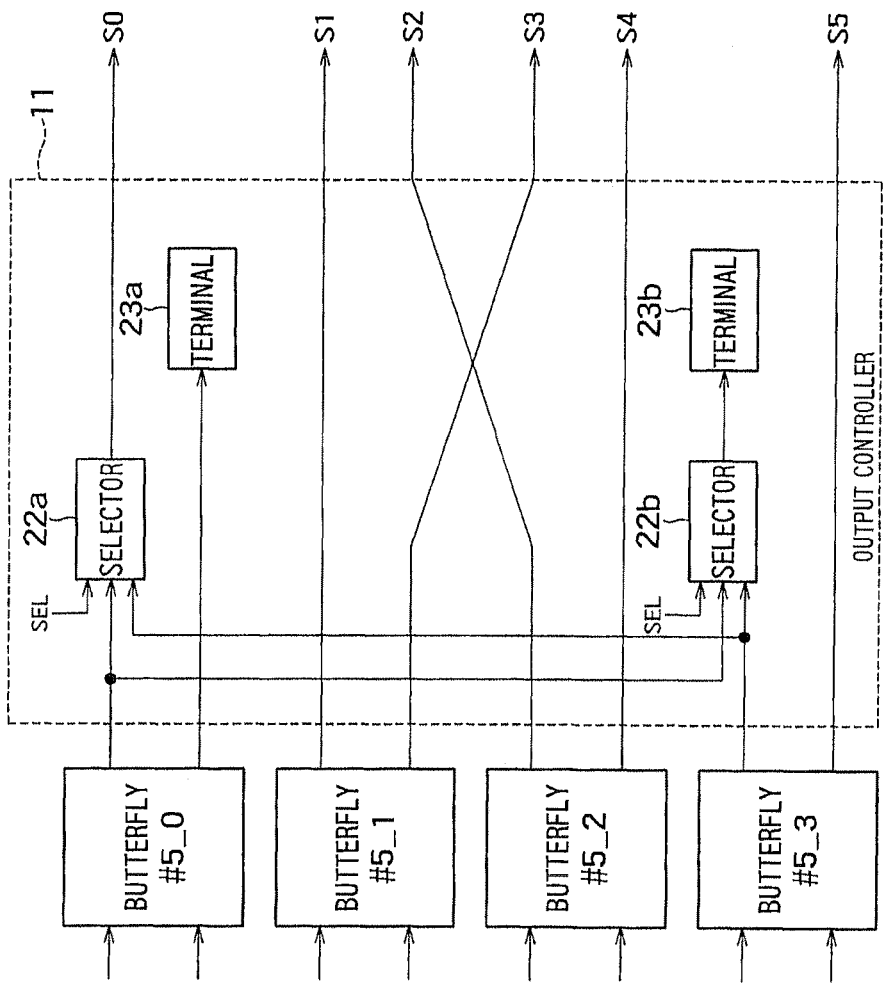
FIG. 21 is a diagram showing a configuration of the output controller of the second embodiment.

FIG. 21 shows a configuration of the output controller 11 when the first selecting circuit #5_0 of the final stage computer selects BFInOrder_0($j,t$), the first selecting circuit #5_1 selects BFInOrder_1($j,t$), the first selecting circuit #5_2 selects BFInOrder_2($j,t$), and the first selecting circuit #5_3 selects BFInOrder_3($j,t$).

The output controller 11 of FIG. 21 includes two selectors 22a and 22b and two terminal ports 23a and 23b. The signal line S0 outputs data selected by the selector 22a to the outside, and signal lines S1 to S5 output data from connected output ports to the outside. The terminal ports 23a and 23b discard data from connected output ports or selectors.

The two selectors 22a and 22b operate to exchange output positions of the right-end carrier (24th carrier in the present embodiment) of the signal band and the DC carrier (0th carrier) at time (t=0 here) in which the output of the final stage computer is the DC carrier. More specifically, the selectors 22a and 22b operate according to the selection signal SEL from the outside to exchange the outputs between the No. 0 output port of the butterfly #5_0 and a No. 0 output port of the butterfly #5_3 at t=0.

Two output ports of the butterfly operation circuit #5_1, two output ports of the butterfly operation circuit #5_2, and a No. 1 output port of the butterfly operation circuit #5_3 correspond to the port A in FIG. 21. The No. 1 output port of the butterfly operation circuit #5_0 corresponds to the port B, the No. 0 output port of the butterfly operation circuit #5_0 corresponds to the port C, and the No. 0 output port of the butterfly operation circuit #5_3 corresponds to the port D. The signal lines S1 to S5 are equivalent to the first signal line, the signal line S0 is equivalent to the second signal line, the terminal 23a is equivalent to the first terminal, and the terminal 23b is equivalent to the second terminal.

Figure 22:
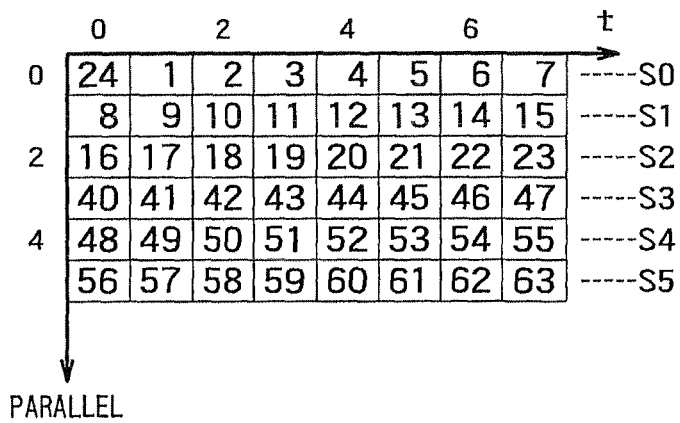
FIG. 22 is a diagram showing an order of output by the FFT unit of the second embodiment.

FIG. 22 shows an order of output by the output controller 11, i.e. an order of output by the FFT unit 205.

It can be recognized that adjacent data subcarriers are output in parallel and consecutively except for the right-end data carrier of the signal band (24th carrier).

According to the second embodiment, the same advantageous effects as in the first embodiment can be obtained even if N=6, M=1, L=2, and k=3.

Third Embodiment

A third embodiment is a case in which the parameters "N", "M", "L", and "k" used in the first embodiment are N=6, M=1, L=2, and k=2. Therefore, the number of points of the FFT unit is 64, the base of the butterfly operation circuits is 2, the parallel number of the butterfly operation circuits of the final stage computer is 4, and the number of data carriers is 32. In the present embodiment, the format of the signal transmitted from the signal transmitting apparatus as well as the configuration and the operation of the FFT unit are different from those of the first embodiment.

Figure 23:
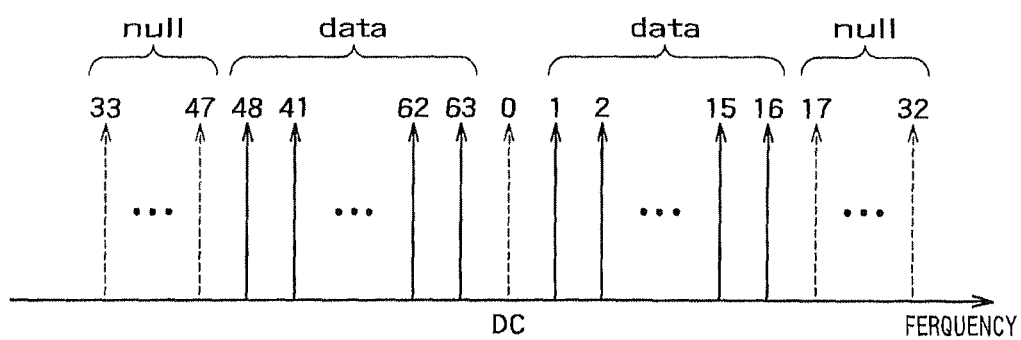
FIG. 23 is a diagram showing a signal format (carrier arrangement) of a third embodiment.

FIG. 23 shows a format of a signal transmitted from the signal transmitting apparatus according to the present embodiment. The number of data carriers is 32, and the number of null carriers is 32.

As in the second embodiment, the block diagram of the FFT unit 205 according to the present embodiment is FIG. 4. However, the configuration and the operation of the output controller 11 are different from those of the second embodiment.

Figure 24:
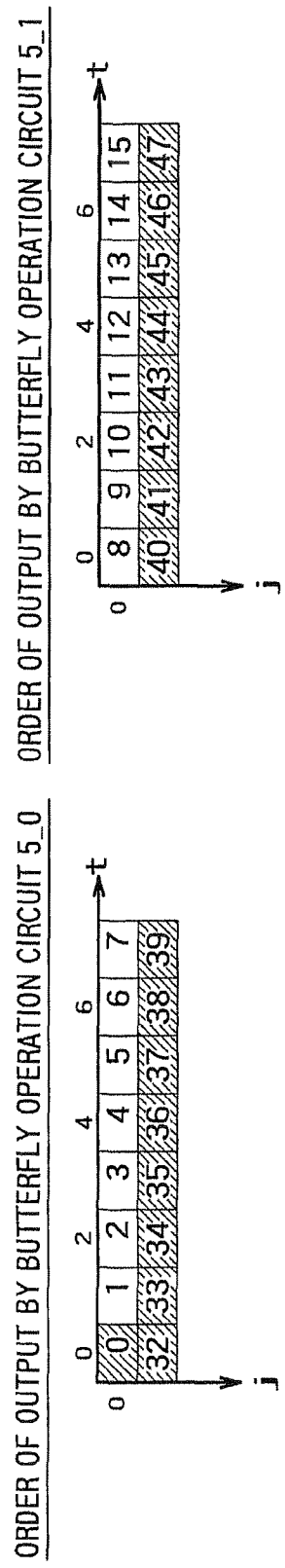
FIG. 24 is a diagram showing orders of output by the butterfly operation circuits of the third embodiment.
Figure 24:
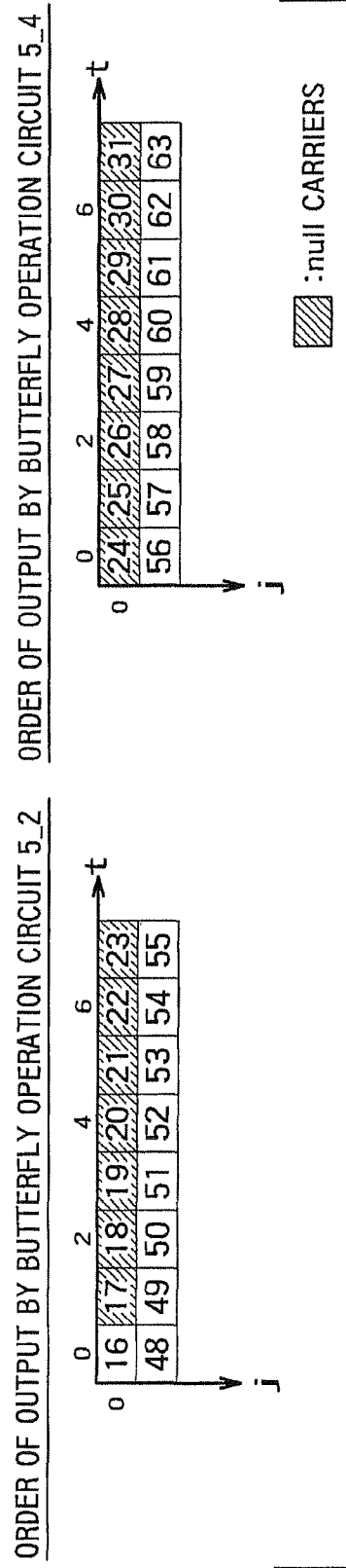

FIG. 24 shows output results of the stage computer #5 (final stage computer), i.e. inputs of the output controller 11.

As in the second embodiment, output results of the butterfly operation circuit #5_0, the butterfly operation circuit #5_1, the butterfly operation circuit #5_2, and the butterfly operation circuit #5_3 when the first selecting circuit #5_0 of the stage computer #5 (final stage computer) has selected BFInOrder_0($j,t$), the first selecting circuit #5_1 has selected BFInOrder_1($j,t$), the first selecting circuit #5_2 has selected BFInOrder_2($j,t$), and the first selecting circuit #5_3 has selected BFInOrder_3($j,t$) are shown.

Figure 25:
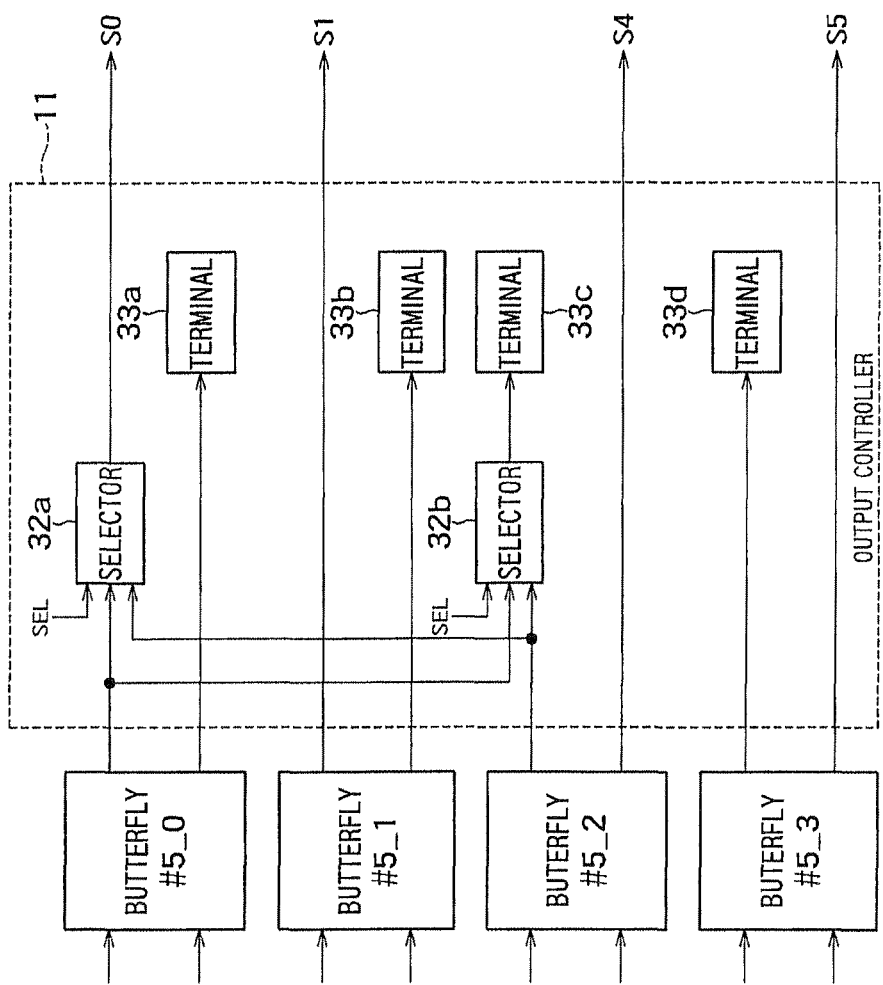
FIG. 25 is a diagram showing a configuration of the output controller of the third embodiment.

FIG. 25 shows a detailed configuration of the output controller 11 of the present embodiment.

The output controller 11 of FIG. 25 includes two selectors 32a and 32b and four terminal ports 33a to 33d. The signal line S0 outputs data selected by the selector 32a to the outside, and the signal lines S1 to S3 output data from connected output ports to the outside. The terminal ports 33a, 33b, 33c, and 33d discard data from connected output ports or selectors.

The two selectors 32a and 32b operate to exchange output positions of the right-end carrier of the signal band (16th carrier in the present embodiment) and the DC carrier (0th carrier) only at time (t=0 here) in which the output of the stage computer #5 (final stage computer) is the DC carrier. More specifically, the selectors 32a and 32b operate according to the selection signal SEL from the outside to exchange outputs between the No. 0 port of the butterfly #5_0 and a No. 0 port of the butterfly #5_2 at t=0.

The No. 0 output port of the butterfly operation circuit #5_1 and No. 1 output ports of the butterfly operation circuits #5_2 and #5_3 in FIG. 25 correspond to the port A. The No. 1 output ports of the butterfly operation circuits #5_0 and #5_1 and the No. 0 output port of the butterfly operation circuit #5_3 correspond to the port B. The No. 0 output port of the butterfly operation circuit #5_0 corresponds to the port C. The No. 0 output port of the butterfly operation circuit #5_2 corresponds to the port D. The signal lines S1 to S3 are equivalent to the first signal line, the signal line S0 is equivalent to the second signal line, the terminals 33a, 33b, and 33d are equivalent to the first terminal, and the terminal 33c is equivalent to the second terminal.

Figure 26:
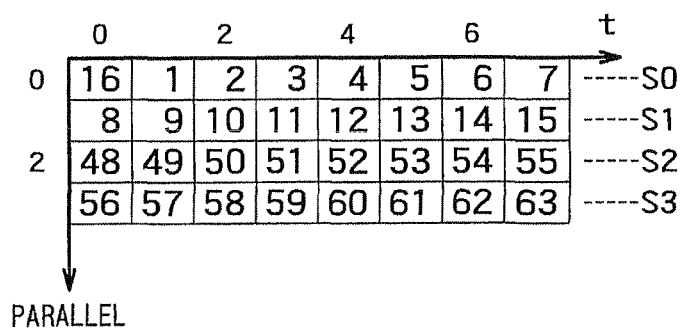
FIG. 26 is a diagram showing an order of output by the FFT unit of the third embodiment.

FIG. 26 shows an order of output by the output controller, i.e. an order of output by the FFT unit 205.

Adjacent data subcarriers are output in parallel and consecutively except for the right-end data carrier of the signal band (16th carrier).

According to the third embodiment, the same advantageous effects as in the first embodiment can be obtained even if N=6, M=1 L=2, and k=2.

Fourth Embodiment

A fourth embodiment is a case in which the parameters "N", "M", "L", and "k" used in the first embodiment are N=6,
M=2, L=1, and k=3. Therefore, the number of points of the FFT unit is 64, the base of the butterfly operation circuits is 4, the parallel number of the butterfly operation circuits of the final stage computer is 2, and the number of data carriers is 48. In the present embodiment, the format of the signal transmitted from the signal transmitting apparatus as well as the configuration and the operation of the FFT unit are different from those of the first embodiment.

Figure 27:
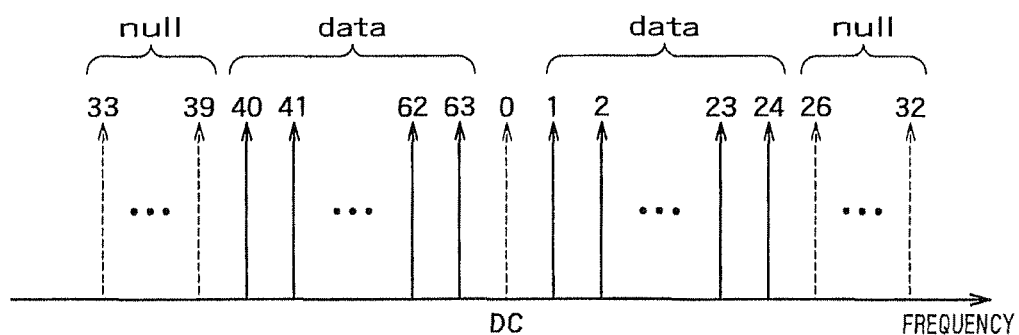
FIG. 27 is a diagram showing a signal format (carrier arrangement) of a fourth embodiment.

FIG. 27 shows a format of a signal transmitted from the signal transmitting apparatus according to the fourth embodiment. The number of data carriers is 48, and the number of null carriers is 16.

Figure 28:
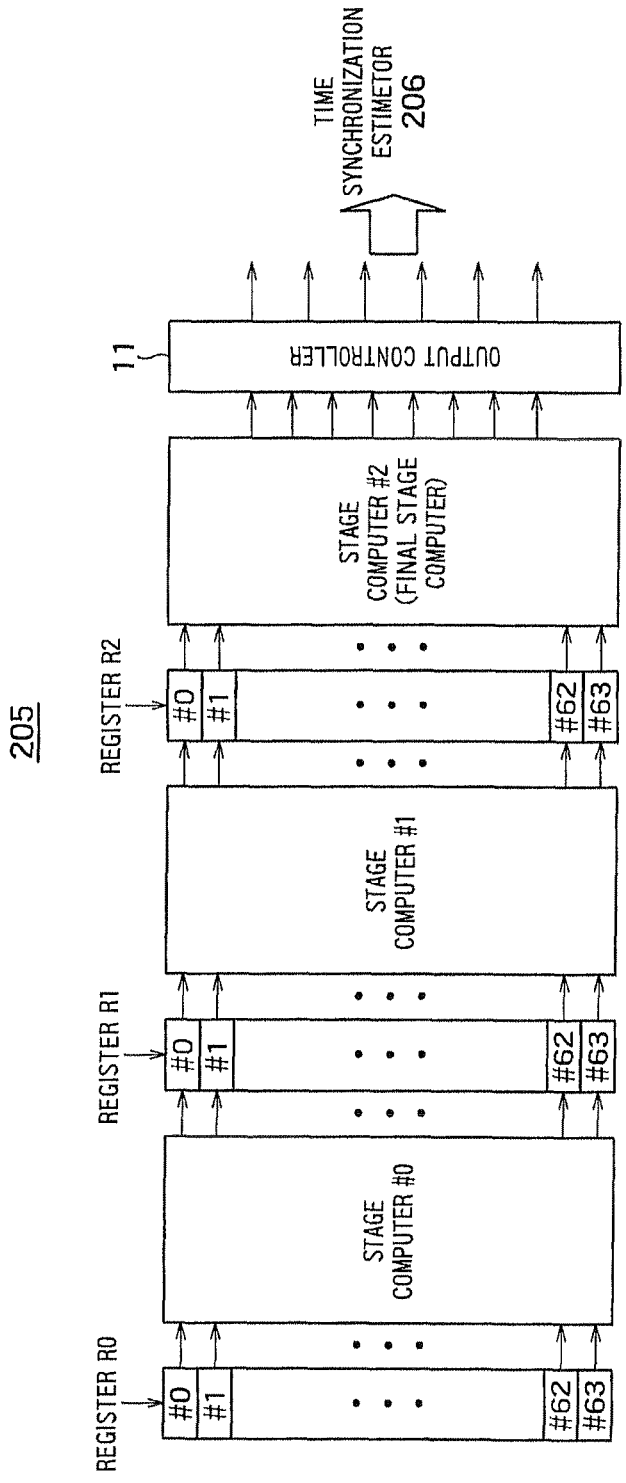
FIG. 28 is a diagram showing a configuration of the FFT unit of the fourth embodiment.

FIG. 28 shows a configuration of the FFT unit 205 according to the fourth embodiment.

The FFT unit 205 of FIG. 28 includes: a plurality of sequential stage computers #0 to #2; register groups R0 to R2 including registers #0 to #63 that temporarily store input values of the FFT unit or output values of the stage computers, the number of registers #0 to #63 being equal to the number of points of the FFT unit (64 in the present embodiment); and the output controller 11 that changes the order of output by a final stage computer #2.

In the present embodiment, the number of stage computers=$\log_{base\ of\ butterfly\ operation\ circuits}$ (the number of points of the FFT unit)=$\log_4 64=3$.

Figure 29:
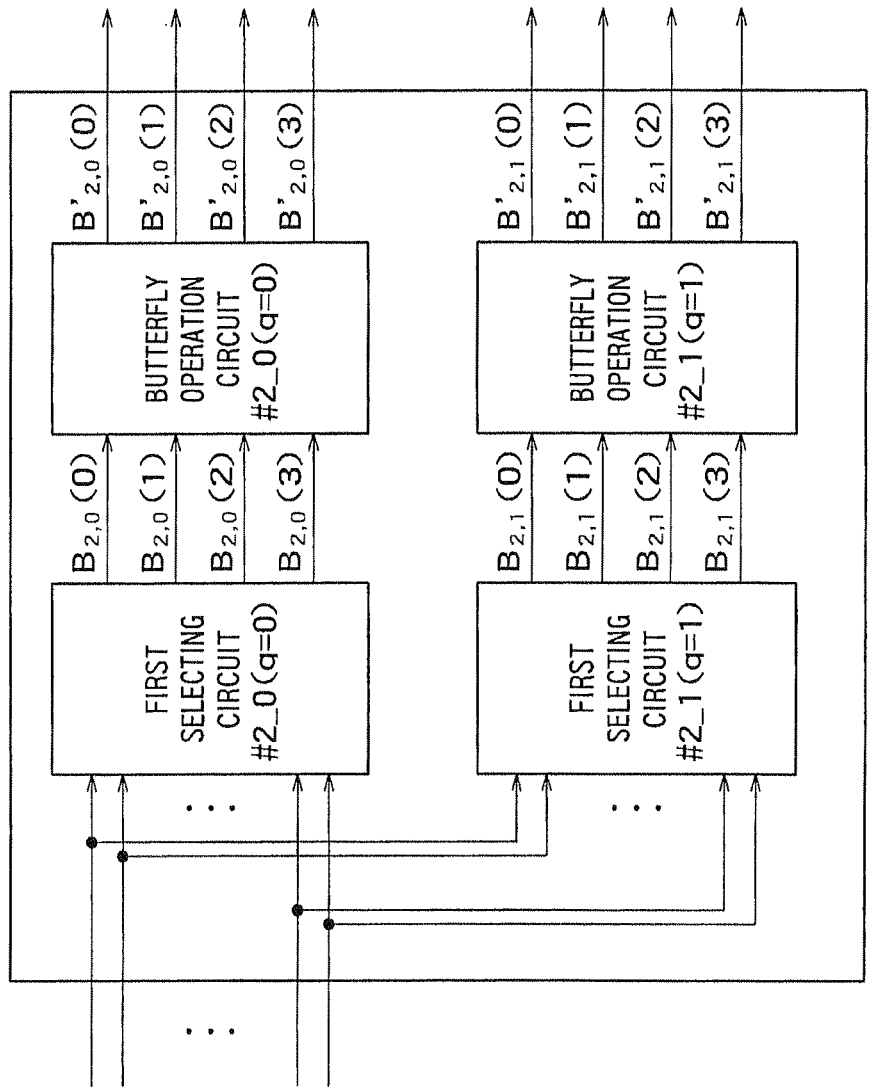
FIG. 29 is a diagram showing a configuration of the final stage computer of the fourth embodiment.

FIG. 29 shows a configuration of the final stage computer #2.

The final stage computer #2 includes one or a plurality of butterfly operation circuits and the same number of first selecting circuits as the number of the butterfly operation circuits.

Figure 30:
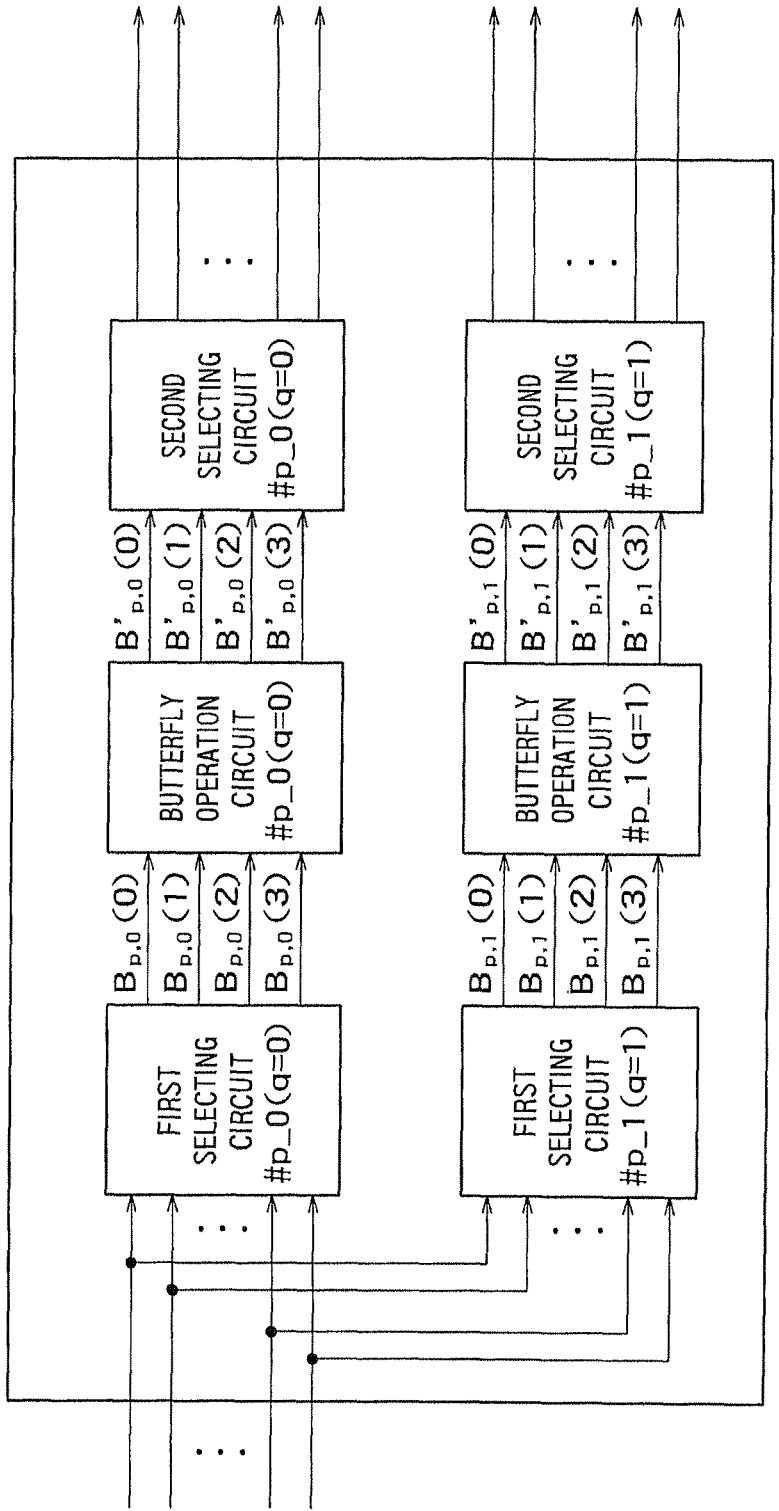
FIG. 30 is a diagram showing a configuration of stage computers other than the final stage computer of the fourth embodiment.

FIG. 30 shows a configuration of the stage computers #0 and #1 other than the final stage computer.

The stage computers #0 and #1 include one or a plurality of butterfly operation circuits, the same number of first selecting circuits as the number of butterfly operation circuits, and the same number of second selecting circuits as the number of the butterfly operation circuits.

In the present embodiment, although the parallel number of the butterfly operation circuits of the stage computers #0 and #1 is two, which is the same as the parallel number of the butterfly operation circuits of the final stage computer, the parallel number may be an arbitrary value.

An operation of the FFT unit 205 will be described with reference to FIGS. 28 to 32.

As in the first embodiment, input signals x(a) ($0 \leq a \leq 2^N-1$) of the FFT unit 205 are stored in the registers determined by a formula register #a=x(a) ($0 \leq a \leq 63$) in the register group R0.

The signals stored in the registers #0 to #63 of the register group R0 are input to the stage computer #0. Each of the first selecting circuits #p_0 and #P_1 (p=0 here) of FIG. 30 selects four registers at the same time and inputs the registers to the corresponding butterfly operation circuits #p_0 and #p_1. Register values selected by the first selecting circuit #p_0 are expressed by $B_{p,0}(0)$, $B_{p,0}(1)$, $B_{p,0}(2)$, and $B_{p,0}(3)$ in FIG. 30, and register values selected by the first selecting circuit #p_1 are expressed by $B_{p,1}(0)$, $B_{p,1}(1)$, $B_{p,1}(2)$, and $B_{p,1}(3)$ in FIG. 30.

In the present embodiment, the registers selected by the first selecting circuits #p_0 and #p_1, i.e. input values of the butterfly operation circuits #p_0 and #p_1, may be arbitrary as long as the order of an FFT algorithm (FFT algorithm of base 4 in the present embodiment) indicated by the following formula is not disrupted.

$$\begin{cases} S(4k) = \sum_{n=0}^{N'/4-1} \left[ s(n) + s\left(n + \frac{N'}{4}\right) + s\left(n + \frac{N'}{2}\right) + \right. \\ \left. s\left(n + \frac{3N'}{4}\right) \right] \cdot W_{N'/4}^{kn}, \left(k = 0, 1, \ldots, \frac{N'}{4} - 1\right) \\ S(4k+1) = \sum_{n=0}^{N'/4-1} \left[ s(n) - j \cdot s\left(n + \frac{N'}{4}\right) - s\left(n + \frac{N'}{2}\right) + \right. \\ \left. j \cdot s\left(n + \frac{3N'}{4}\right) \right] \cdot W_{N'}^{n} \cdot W_{N'/4}^{kn}, \left(k = 0, 1, \ldots, \frac{N'}{4} - 1\right) \\ S(4k+2) = \sum_{n=0}^{N'/4-1} \left[ s(n) - s\left(n + \frac{N'}{4}\right) + s\left(n + \frac{N'}{2}\right) - \right. \\ \left. s\left(n + \frac{3N'}{4}\right) \right] \cdot W_{N'}^{2n} \cdot W_{N'/4}^{kn}, \left(k = 0, 1, \ldots, \frac{N'}{4} - 1\right) \\ S(4k+3) = \sum_{n=0}^{N'/4-1} \left[ s(n) + j \cdot s\left(n + \frac{N'}{4}\right) - s\left(n + \frac{N'}{2}\right) - \right. \\ \left. j \cdot s\left(n + \frac{3N'}{4}\right) \right] \cdot W_{N'}^{3n} \cdot W_{N'/4}^{kn}, \left(k = 0, 1, \ldots, \frac{N'}{4} - 1\right) \end{cases}$$ (Formula 7)

Wherein, "$W_N$" denotes rotation factors and is defined by the following formula.

$$W_{N'} = \exp\left(-j\frac{2\pi}{N'}\right)$$

Butterfly operations indicated by the following formula are applied to the values input to the butterfly operation circuits #p_0 and #p_1 based on the FFT algorithm of base 4 of the formula above.

$$\begin{cases} B'_{p,q}(0) = B_{p,q}(0) + B_{p,q}(1) + B_{p,q}(2) + B_{p,q}(3) \\ B'_{p,q}(1) = [B_{p,q}(0) - j \cdot B_{p,q}(1) - B_{p,q}(2) + \\ \qquad j \cdot B_{p,q}(3)] \cdot W_{N'}^{n} \\ B'_{p,q}(2) = [B_{p,q}(0) - B_{p,q}(1) + B_{p,q}(2) - \\ \qquad B_{p,q}(3)] \cdot W_{N'}^{2n} \\ B'_{p,q}(3) = [B_{p,q}(0) + j \cdot B_{p,q}(1) - B_{p,q}(2) - \\ \qquad j \cdot B_{p,q}(3)] \cdot W_{N'}^{3n} \end{cases}$$ Formula (8)

As in the first embodiment, corresponding second selecting circuits #p_0 and #p_1 select registers with the same numbers as the registers, from which corresponding values Bp,q(j) are read, from the register group R1, and computation values (outputs B'p,q(j)) of the butterfly operation circuits #p_0 and #p_1 are stored in the selected registers.

The process of the stage computer #1 is the same as that of the stage computer #0, and the details will not be described.

An operation of the final stage computer #2 as a point of the present embodiment will be described with reference to FIGS. 29, 31, and 32.

As in the first embodiment, signals stored in the registers selected by first selecting circuits #2_0 and #2_1 are input to corresponding butterfly operation circuits #2_0 and #2_1.

As in the first embodiment, the first selecting circuits #2_0 and #2_1 of the final stage computer select registers (determine the orders of input to the butterfly operation circuits) according to Formula (5) or (5-1). Hereinafter, a case of using Formula (5) will be simulated.

FIG. 31 shows BFInOrder_0(j,t) and BFInOrder_1(j,t) calculated in the same procedure as in the first embodiment, and FIG. 32 shows BFOutOrder_0(j,t) and BFOutOrder_1(j,t) corresponding to FIG. 31. Each of the two first selecting circuits selects one of BFInOrder_0(j,t) and BFInOrder_1(j,t) to avoid overlapping.

Butterfly operations of base 4 (M=2) shown by the following formula are applied to the values input to the butterfly operation circuits #2_0 and #2_1.

$$\begin{cases} B'_{p,q}(0) = B_{p,q}(0) + B_{p,q}(1) + B_{p,q}(2) + B_{p,q}(3) \\ B'_{p,q}(1) = B_{p,q}(0) - j \cdot B_{p,q}(1) - B_{p,q}(2) + j \cdot B_{p,q}(3) \\ B'_{p,q}(2) = B_{p,q}(0) - B_{p,q}(1) + B_{p,q}(2) - B_{p,q}(3) \\ B'_{p,q}(3) = B_{p,q}(0) + j \cdot B_{p,q}(1) - B_{p,q}(2) - j \cdot B_{p,q}(3) \end{cases}$$ Formula (9)

Assuming that the first selecting circuit #2_1 has selected BFInOrder_1(j,t), $B_{2,1}(0)$ is a value stored in a 28th register, $B_{2,1}(1)$ is a value stored in a 29th register, $B_{2,1}(2)$ is a value stored in a 30th register, and $B_{2,1}(3)$ is a value stored in a 31st register at time t=5 with reference to FIG. 31. The butterfly operations are performed based on the values.

Figure 33:
FIG. 33 is a diagram showing orders of output by the butterfly operation circuits of the fourth embodiment.

FIG. 33 shows output results of the butterfly operation circuit #2_0 and the butterfly operation circuit #2_1 when the first selecting circuit #2_0 has selected BFInOrder_0(j,t), and the first selecting circuit #2_1 has selected BFInOrder_1(j,t).

As can be understood from FIG. 33, the butterfly operation circuits of the final stage computer sequentially output adjacent subcarriers in parallel in the time domain direction in all subcarriers including the null carriers.

An operation of the output controller 11 as a second point of the present embodiment will be described with reference to FIG. 34.

Figure 34:
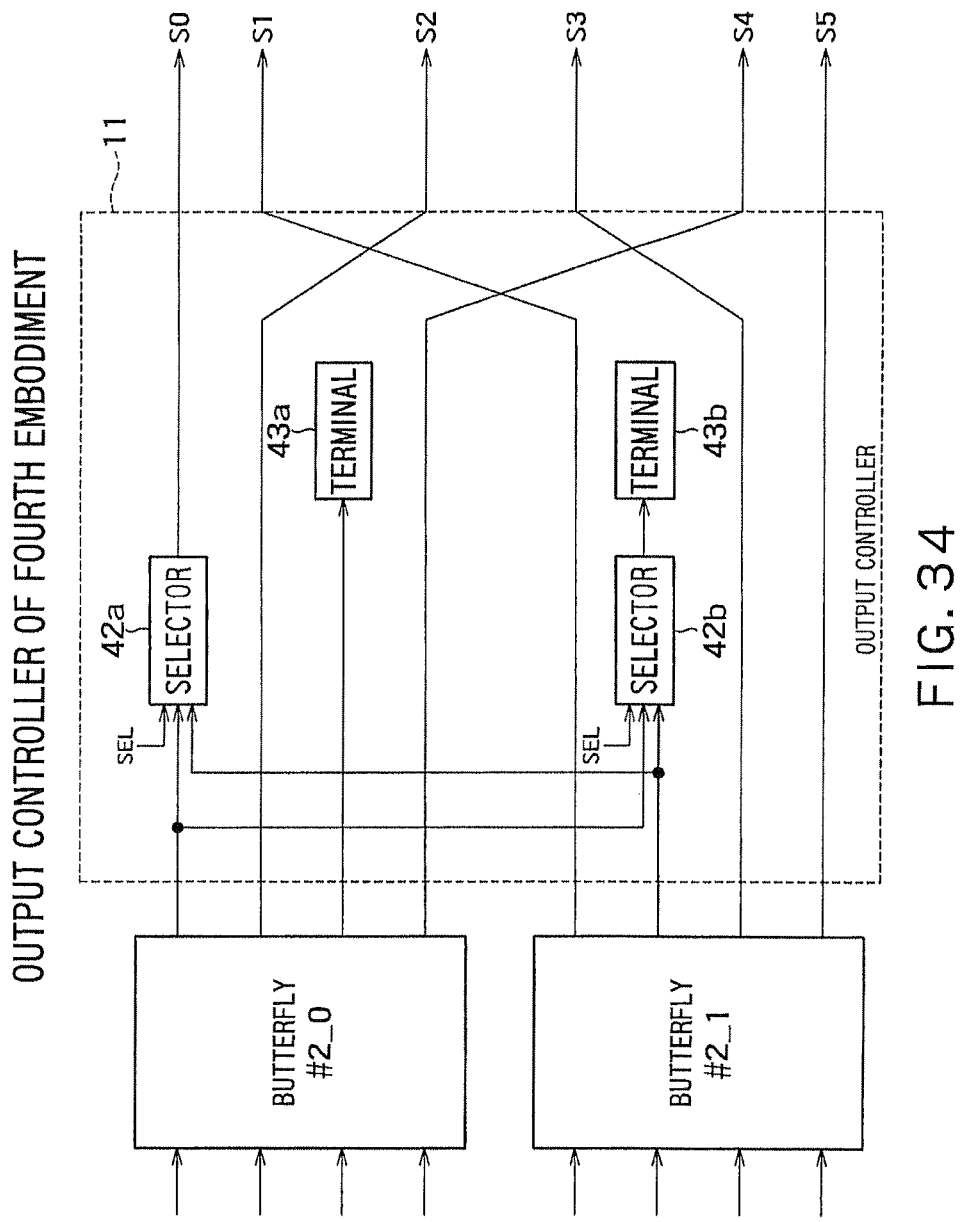
FIG. 34 is a diagram showing a configuration of the output controller of the fourth embodiment.

FIG. 34 shows a configuration of the output controller when the first selecting circuit #2_0 of the final stage selects BFInOrder_0(j,t), and the first selecting circuit #2_1 selects BFInOrder_1(j,t).

The output controller 11 of FIG. 34 includes two selectors 42a and 42b and two terminal ports 43a and 43b. The signal line S0 outputs data selected by the selector 42a to the outside, and the signal lines S1 to S5 output data from connected output ports or selectors to the outside. The terminal ports 43a and 43b discard data from the connected output ports.

The two selectors 42a and 42b operate to exchange the output positions of the right-end carrier of the signal band (24th carrier in the present embodiment) and the DC carrier (0th carrier) only at time (t=0 here) in which the output of the final stage computer is the DC carrier. More specifically, the selectors 42a and 42b operate according to the selection signal SEL from the outside to exchange the outputs between a No. 0 port of the butterfly #2_0 and a No. 1 port of the butterfly #2_1 at t=0.

First and third output ports of the butterfly operation circuit #2_0 and zero-th, second and third output ports of the butterfly operation circuit #2_1 in FIG. 34 correspond to the port A. A No. 2 output port of the butterfly operation circuit #2_0 corresponds to the port B. The No. 0 output port of the butterfly operation circuit #2_0 corresponds to the port C. The No. 1 output port of the butterfly operation circuit #2_1 corresponds to the port D. The signal lines S1 to S5 are equivalent to the first signal line, the signal line S0 is equivalent to the second signal line, the terminal 43a is equivalent to the first terminal, and the terminal 43b is equivalent to the second terminal.

Figure 35:
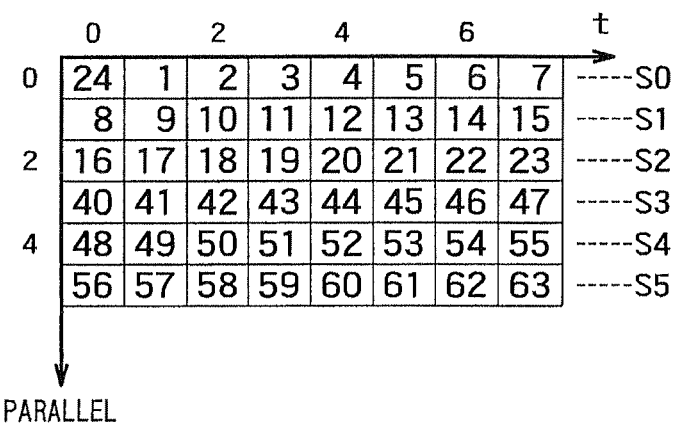
FIG. 35 is a diagram showing an order of output by the FFT unit of the fourth embodiment.

FIG. 35 shows an order of output by the output controller 11, i.e. an order of output by the FFT unit 205. Adjacent data subcarriers are output in parallel and consecutively except for the right-end data carrier of the signal band (24th carrier).

According to the fourth embodiment, the same advantageous effects as in the first embodiment can be obtained even if N=6, M=2, L=1, and k=3.

Fifth Embodiment

A fifth embodiment is a case in which the parameters "N", "M", "L", and "k" used in the first embodiment are N=6, M=2, L=2, and k=7. Therefore, the number of points of the FFT unit is 64, the base of the butterfly operation circuits is 4, the parallel number of the butterfly operation circuits of the final stage computer is 4, and the number of data carriers is 56. In the present embodiment, the format of the signal transmitted from the signal transmitting apparatus as well as the configuration and the operation of the FFT unit are different from those of the first embodiment.

Figure 36:
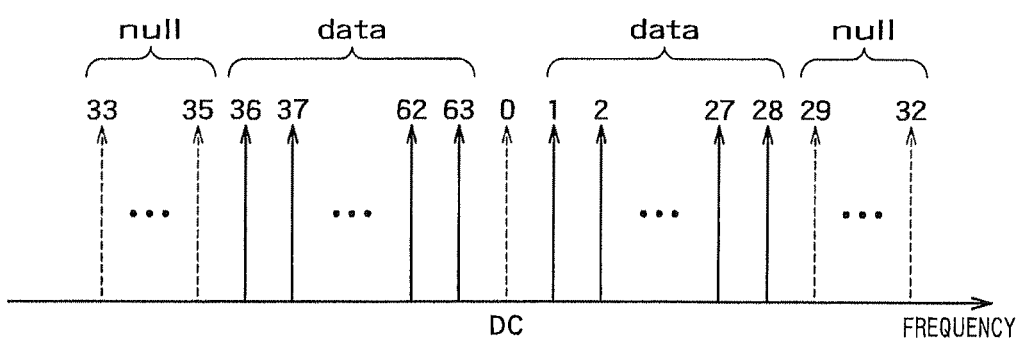
FIG. 36 is a diagram showing a signal format (carrier arrangement) of a fifth embodiment.

FIG. 36 shows a format of a signal transmitted from the signal transmitting apparatus according to the present embodiment. The number of data carriers is 56, and the number of null carriers is 8.

A block diagram of the FFT unit 205 according to the present embodiment is FIG. 28 as in the fourth embodiment. However, the configurations and the operations of the final stage computer #2 and the output controller 11 are different from those of the fourth embodiment.

Figure 37:
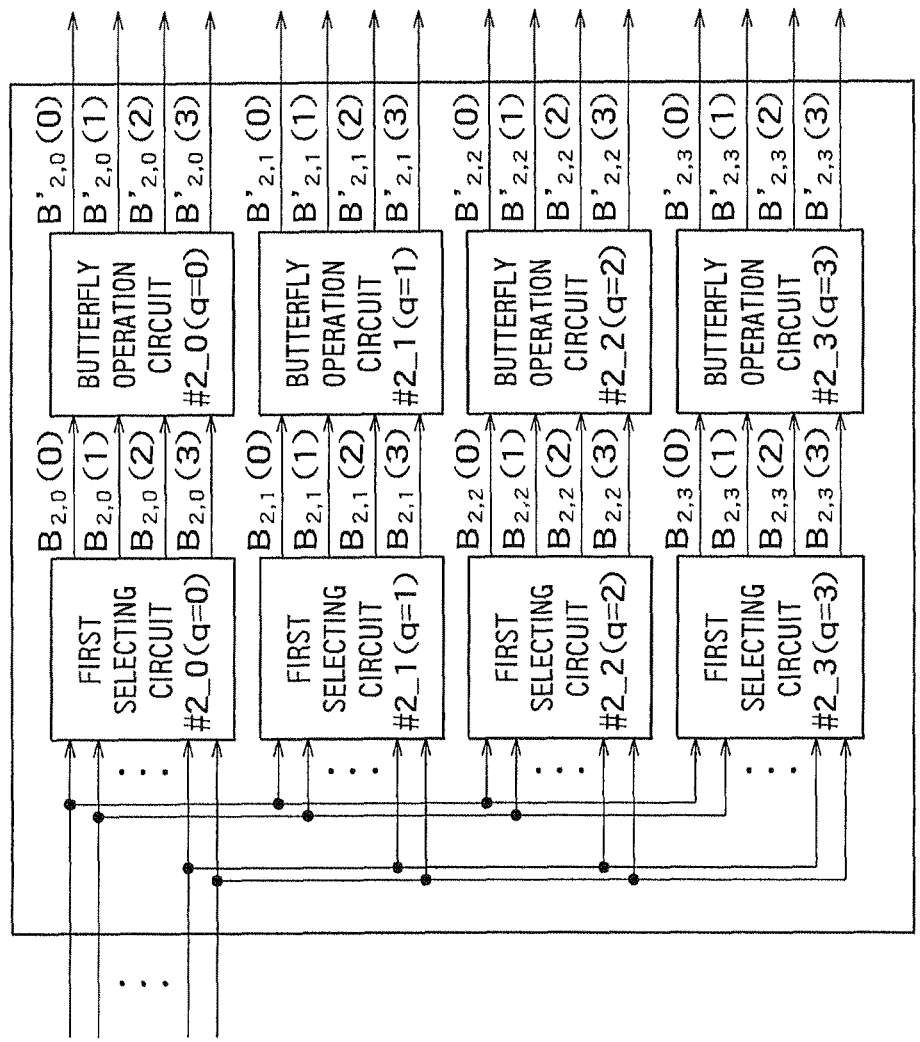
FIG. 37 is a diagram showing a configuration of the final stage computer of the fifth embodiment.

FIG. 37 shows a configuration of the final stage computer #2 of the present embodiment.

The final stage computer #2 includes a plurality of butterfly operation circuits #2_0 to #2_3 and the same number of first selecting circuits #2_0 to #2_3 as the number of the butterfly operation circuits. In the present embodiment, the number (parallel number) of butterfly operation circuits of the final stage computer is 4 (L=2).

An operation of the final stage computer #2 as a point of the present embodiment will be described with reference to FIGS. 37 to 39.

As in the first embodiment, each of the first selecting circuits #2_0 to #2_3 selects four registers at the same time, and signals stored in the selected registers are input to corresponding butterfly operation circuits #2_0 to #2_3. As in the first embodiment, the first selecting circuits of the final stage computer determine the selection order of the registers, i.e. order of input to the butterfly operation circuits, according to Formula (5) or (5-1). Hereinafter, a case of using Formula (5) will be simulated.

Figure 38:
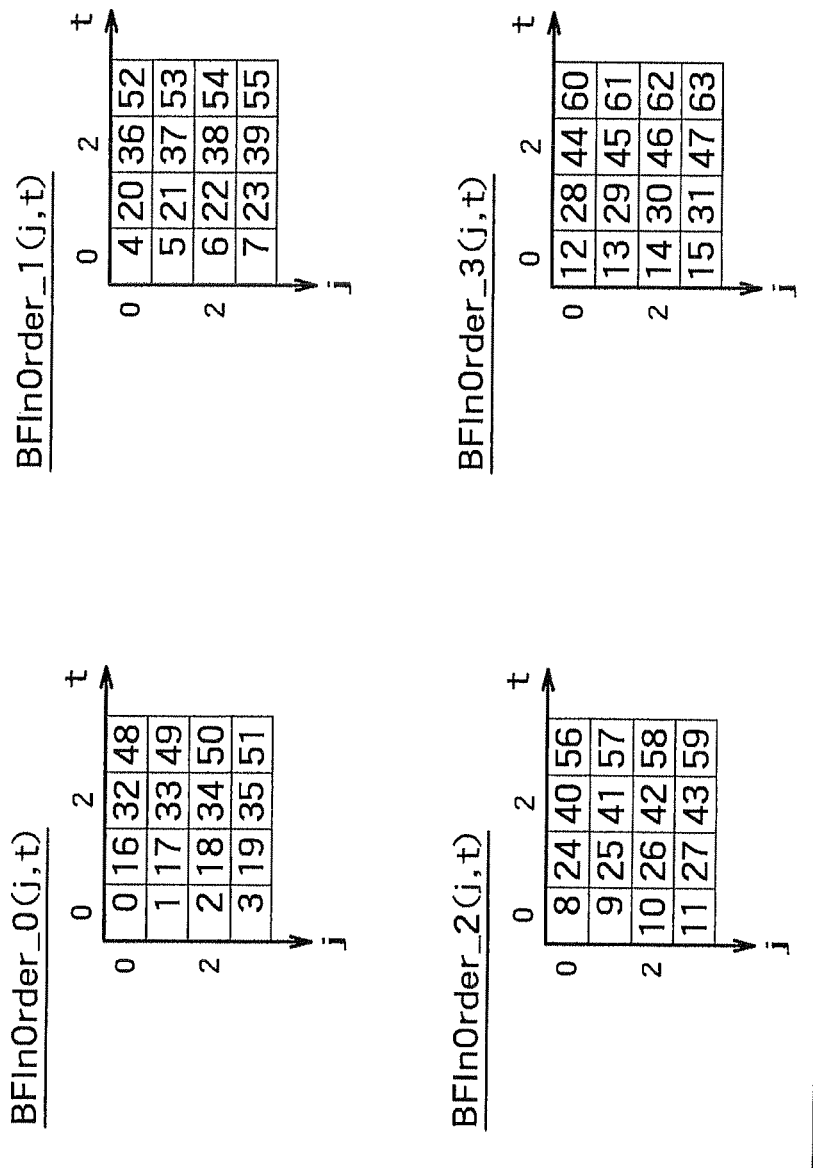
FIG. 38 is a diagram showing BFInOrder_i(j, t) functions of the fifth embodiment.
Figure 39:
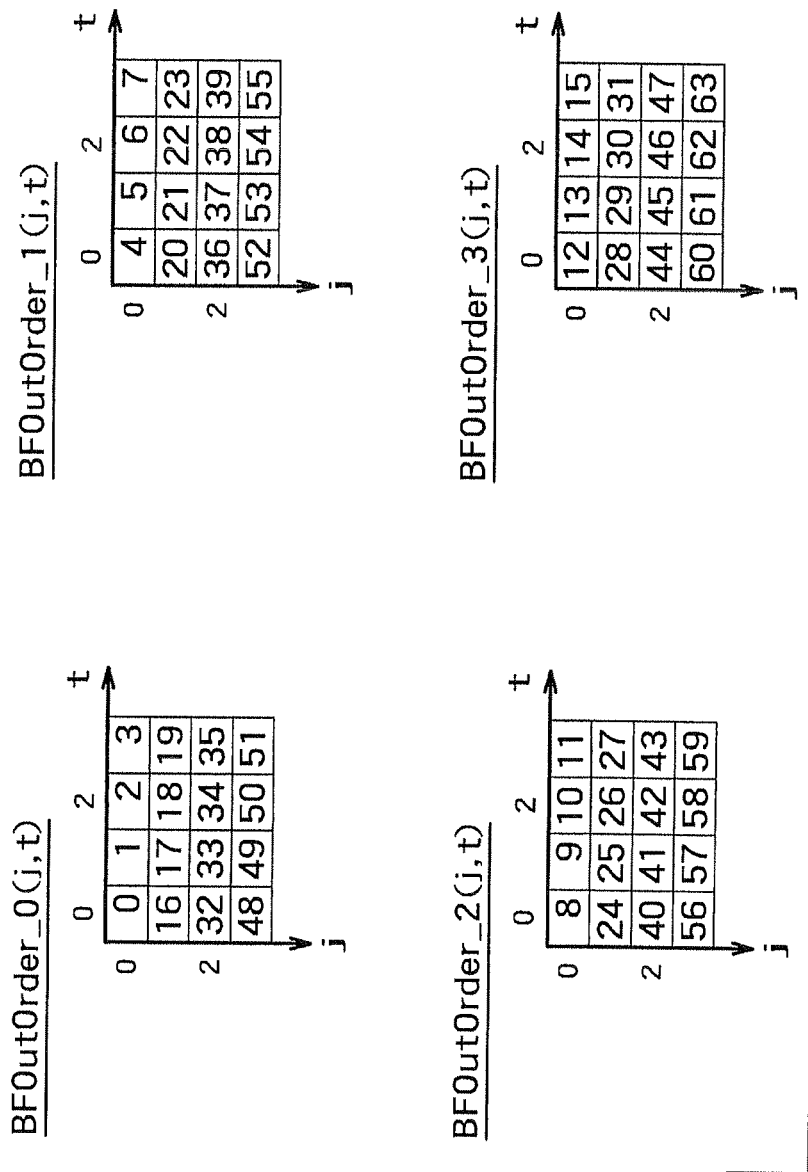
FIG. 39 is a diagram showing BFOutOrder_j(j, t) functions of the fifth embodiment.

FIG. 38 shows BFInOrder_0$(j,t)$, BFInOrder_1$(j,t)$, BFInOrder_2$(j,t)$, and BFInOrder_3$(j,t)$ calculated in the same procedure as in the first embodiment. FIG. 39 shows BFOutOrder_0$(j,t)$, BFOutOrder_1$(j,t)$, BFOutOrder_2$(j,t)$, and BFOutOrder_3$(j,t)$ corresponding to FIG. 38.

Each of the four first selecting circuits selects one of BFInOrder_0$(j,t)$, BFInOrder_1$(j,t)$, BFInOrder_2$(j,t)$, and BFInOrder_3$(j,t)$ to avoid overlapping.

Butterfly operations of base 4 (M=2) are applied to the values input to the butterfly operation circuits #2_0 to #2_3 according to Formula (9).

For example, assuming that the first selecting circuit #2_1 has selected BFInOrder_1$(j,t)$, $B_{2,1}(0)$ is a value stored in a 36th register, $B_{2,1}(1)$ is a value stored in a 37th register, $B_{2,1}(2)$ is a value stored in a 38th register, and $B_{2,1}(3)$ is a value stored in a 39th register at time t=2 with reference to FIG. 38. The values are input to the butterfly operation circuit #2_1, and the butterfly operations of base 4 (M=2) are applied.

FIG. 40 shows output results of the butterfly operation circuit #2_0, the butterfly operation circuit #2_1, the butterfly operation circuit #2_2, and the butterfly operation circuit #2_3 when the first selecting circuit #2_0 has selected BFInOrder_0$(j,t)$, the first selecting circuit #2_1 has selected BFInOrder_1$(j,t)$, the first selecting circuit #2_2 has selected BFInOrder_2$(j,t)$, and the first selecting circuit #2_3 has selected BFInOrder_3$(j,t)$.

As can be understood from FIG. 40, the butterfly operation circuits of the final stage computer sequentially output adjacent subcarriers in parallel along the time domain in all subcarriers including the null carriers.

An operation of the output controller 11 as a second point of the present embodiment will be described with reference to FIG. 41.

Figure 41:
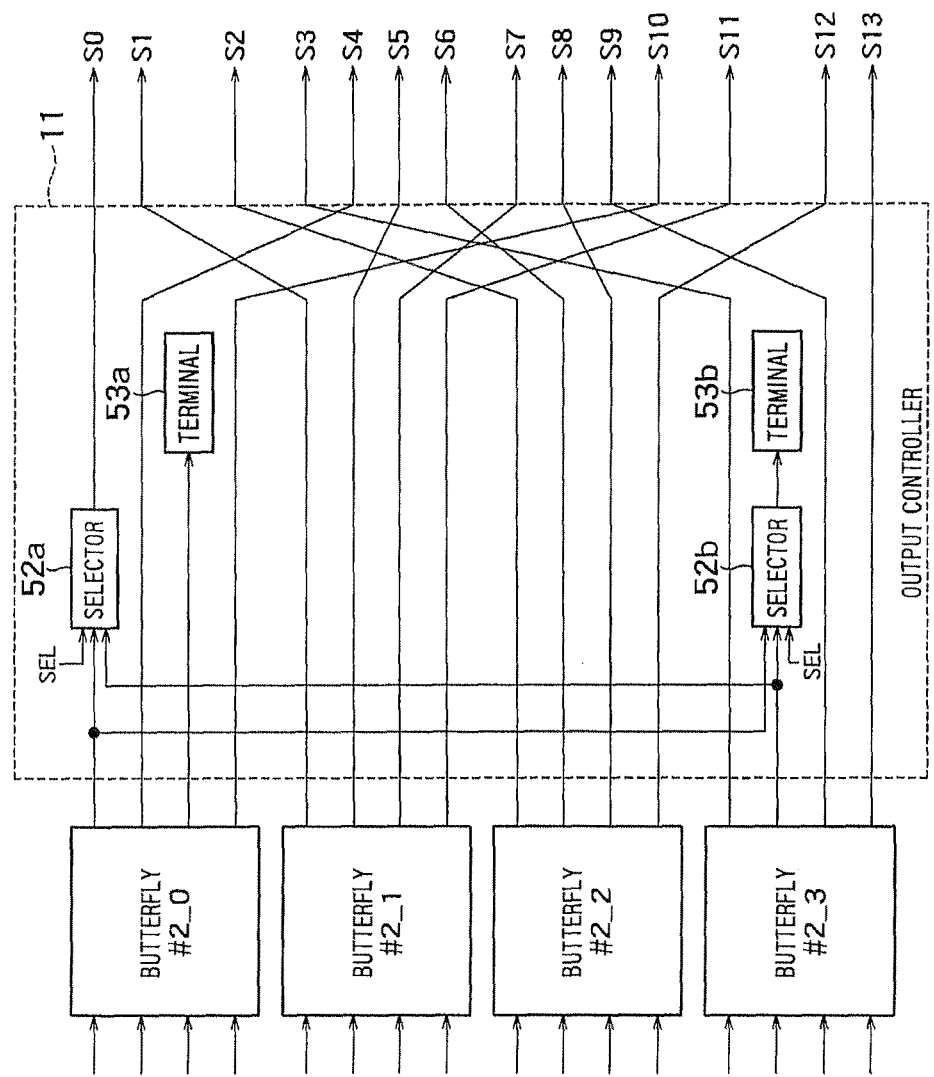
FIG. 41 is a diagram showing a configuration of the output controller of the fifth embodiment.

FIG. 41 shows a configuration of the output controller when the first selecting circuit #2_0 of the first stage computer #2 selects BFInOrder_0$(j,t)$, the first selecting circuit #2_1 selects the BFInOrder_1$(j,t)$, the first selecting circuit #2_2 selects BFInOrder_2$(j,t)$, and the first selecting circuit #2_3 selects BFInOrder_3$(j,t)$.

The output controller 11 of FIG. 41 includes two selectors 52a and 52b and two terminal ports 53a and 53b. The signal line S0 outputs data selected by the selector 52a to the outside, and signal lines 51 to S13 output data from connected output ports to the outside. The terminal ports 53a and 53b discard data from connected output ports or selectors.

The two selectors 52a and 53b operate to exchange the output positions of the right-end carrier of the signal band (28th carrier in the present embodiment) and the DC carrier (0th carrier) at time (t=0 here) in which the output of the final stage computer #2 is the DC carrier. More specifically, the selectors 52a and 53b operate according to the selection signal SEL from the outside to exchange the outputs between the No. 0 output port of the butterfly #2_0 and a No. 1 output port of the butterfly #2_3 at t=0.

The first and third output ports of the butterfly operation circuit #2_0, all output ports of the butterfly operation circuits #2_1 and #2_2, and zero-th, second, and third output ports of the butterfly operation circuit #2_3 in FIG. 41 correspond to the port A. The No. 2 output port of the butterfly operation circuit #2_0 corresponds to the port B. The No. 0 output port of the butterfly operation circuit #2_0 corresponds to the port C. The No. 1 output port of the butterfly operation circuit #2_3 corresponds to the port D. The signal lines S1 to S13 are equivalent to the first signal line, the signal line S0 is equivalent to the second signal line, the terminal 53a is equivalent to the first terminal, and the terminal 53b is equivalent to the second terminal.

FIG. 42 shows an order of output by the output controller 11, i.e. an order of output by the FFT unit 205.

According to the operations of the two selectors 52a and 52b, adjacent data subcarriers are output in parallel and consecutively except for the right-end data carrier of the signal band (28th carrier).

According to the fifth embodiment, the same advantageous effects as in the first embodiment can be obtained even if N=6, M=2, L=2, and k=7.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

In addition to a signal receiving apparatus that receives an OFDM signal, the embodiments as described above can be applied to various apparatuses including FFT units.

The invention claimed is:

1. A signal receiving apparatus of an orthogonal frequency division multiplex scheme using $2^N$ subcarriers including $2^{(N-(M+L))}*2k$ data subcarriers and $2^N-\{2^{(N-(M+L))}*2k\}$ null subcarriers where "N" is an integer equal to or greater than 2, "M" is an integer equal to or greater than 1 where $2^N/2^M$ is an integer, "L" is an integer equal to or greater than 1 and equal to or smaller than (N−M−1) when "M" is 1 and is an integer equal to or greater than 0 and equal to or smaller than (N−M−1) when "M" is greater than 1, and "k" is an integer satisfying $1 \leq k \leq 2^{(M+L-1)}-1$, comprising:

0th to p−1th stage computers configured to apply, in a step by step manner, butterfly operations to $2^N$ input values corresponding to $2^N$ FFT (Fast Fourier Transform) points where "p" is a value equal to $(\log_{2^M} 2^N)-1$;

$2^N$ registers arranged corresponding to the $2^N$ FFT points and to store values obtained by the butterfly operation by the p−1th stage computer;

a pth stage computer comprising (a) $2^L$ butterfly operation circuits, each including $2^M$ input ports and $2^M$ output ports, performing the butterfly operation based on values provided to the input ports, and transmitting values obtained by the butterfly operation from the corresponding output ports and (b) $2^L$ selecting circuits arranged corresponding to the butterfly operation circuits, each selecting circuit reading a value of a register corresponding to different one of $2^L$ BFInOrder_i(j,t) and providing the value to a j $(0 \leq j \leq 2^M-1)$th input port of the corresponding butterfly operation circuit where the BFInOrder_i(j,t) denotes values obtained by converting BFOutOrder_i(j,t) expressed by base H to base $2^M$ of $\log_{2^M} 2^N$ words, word-reversing the converted values, and converting the word-reversed values to the base H, wherein "H" is an integer greater than 1, and the BFOutOrder_i(j,t) denotes $t+j*2^{(N-M)}+i*2^{N-(M+L)}$ or $(2^{(N-(M+L))}-1-t)+j*2^{(N-M)}+i*2^{(N-(M+L))}$, wherein "t" is an integer expressing a computation time being 0 or greater and $2^{(N-(M+L))}-1$ or smaller, and i is an integer 0 or greater and $2^L-1$ or smaller; and an output controller configured to selectively output values corresponding to the data subcarriers among the values transmitted from the output ports of the butterfly operation circuits.

2. The apparatus according to claim 1, wherein each of the output ports of the butterfly operation circuits is one of a port A to transmit only values corresponding to the data subcarriers, a port B to transmit only values corresponding to the null subcarriers, a port C to transmit a value corresponding to a DC carrier among the null subcarriers and values corresponding to the data subcarriers, and a port D to transmit a value corresponding to one of the data subcarriers and values corresponding to the null subcarriers, the value corresponding to the DC carrier transmitted from the C port and the value corresponding to the one of the data subcarriers transmitted from the D port are calculated in different butterfly operation circuits at same computation time, and the output controller comprises:

a first signal line to output values transmitted from the port A;

a first terminal to terminate values transmitted from the port B;

a second signal line to output values transmitted from the port C;

a second terminal to terminate values transmitted from the port D; and a selector to switch the value corresponding to the DC carrier transmitted from the C port and the value corresponding to the one of the data subcarriers transmitted from the D port to terminate the value corresponding to the DC carrier at the second terminal and to output the value corresponding to the one of the data subcarriers from the second signal line.

3. A communication system of an orthogonal frequency division multiplex scheme using $2^N$ subcarriers including $2^{(N-(M+L))}*2k$ data subcarriers and $2^N-\{2^{(N-(M+L))}*2k\}$ null subcarriers where "N" is an integer equal to or greater than 2, "M" is an integer equal to or greater than 1 where $2^N/2^M$ is an integer, "L" is an integer equal to or greater than 1 and equal to or smaller than (N−M−1) when "M" is 1 and is an integer equal to or greater than 0 and equal to or smaller than (N−M−1) when "M" is greater than 1, and "k" is an integer satisfying $1 \leq k \leq 2^{(M+L-1)}-1$, comprising:

(A) a signal transmitting apparatus comprising:

a modulator configured to modulate transmitted data to generate modulated data;

a mapping unit configured to map the modulated data to the data subcarriers and map null data to the null subcarriers to generate mapping data;

an inverse fast Fourier transform unit configured to apply inverse fast Fourier transform (FFT) to the mapping data to generate an inverse fast Fourier transform signal;

a guard interval adding unit configured to add a guard interval to the inverse fast Fourier transform signal; and a transmitter configured to transmit the inverse fast Fourier transform signal with the added guard interval; and (B) a signal receiving apparatus comprising:

a receiving unit configured to receive the inverse fast Fourier transform signal with the added guard interval;

a guard interval removing unit configured to remove the guard interval from the inverse fast Fourier transform signal with the added guard interval;

0th to p−1th configured to apply, in a step-by-step manner, butterfly operations to values of $2^N$ FFT points in the inverse fast Fourier transform signal after the removal of the guard interval where "p" is a value equal to $(\log_{2^M} 2^N)-1$;

$2^N$ registers arranged corresponding to the $2^N$ FFT points and to store values obtained by the butterfly operations by the p−1th stage computer;

a pth stage computer comprising (a) $2^L$ butterfly operation circuits, each including $2^M$ input ports and $2^M$ output ports, performing the butterfly operation based on values provided to the input ports, and transmitting values obtained by the butterfly operation from the corresponding output ports and (b) $2^L$ selecting circuits arranged corresponding to the butterfly operation circuits, each selecting circuit reading a value of a register corresponding to different one of $2^L$ BFInOrder_i(j,t) and providing the value to a j $(0 \leq j \leq 2^M-1)$th input port of the corresponding butterfly operation circuit where BFInOrder_i(j,t) denotes values obtained by converting BFOutOrder_i(j,t) expressed by base H to base $2^M$ of $\log_{2^M} 2^N$ words, word-reversing the converted values, and converting the word-reversed values to the base H wherein "H" is an integer greater than 1 and BFOutOrder_i(j,t) denotes $t+j*2^{(N-M)}+i*2^{(N-(M+L))}$ or $(2^{(N-(M+L))}-1-t)+j*2^{(N-M)}+i*2^{(N-(M+L))}$, "t" is an integer expressing a computation time being 0 or greater and $2^{(N-(M+L))}-1$ or smaller, "i" is an integer 0 or greater and $2^L-1$ or smaller; and an output controller configured to selectively output values corresponding to the data subcarriers among the values transmitted from the output ports of the butterfly operation circuits.

* * * * *